United States Patent [19]

Miyake

[11] Patent Number: 5,917,963
[45] Date of Patent: Jun. 29, 1999

[54] IMAGE PROCESSING APPARATUS AND IMAGE PROCESSING METHOD

[75] Inventor: Nobutaka Miyake, Yokohama, Japan

[73] Assignee: Canon Kabushiki Kaisha, Tokyo, Japan

[21] Appl. No.: 08/715,116

[22] Filed: Sep. 17, 1996

[30] Foreign Application Priority Data

Sep. 21, 1995 [JP] Japan ................................. 7-242821
Mar. 14, 1996 [JP] Japan ................................. 8-057550

[51] Int. Cl.$^6$ ....................................................... G06K 9/32
[52] U.S. Cl. ..................... 382/300; 382/155; 382/156; 382/161; 382/199; 382/237; 382/264; 382/298; 382/299; 382/300; 358/457; 358/525; 358/534
[58] Field of Search ................................... 382/300, 299, 382/298, 199, 264, 155, 156, 161, 237; 358/525, 534, 457

[56] References Cited

U.S. PATENT DOCUMENTS

| | | | |
|---|---|---|---|
| 5,172,247 | 12/1992 | Ghaderi | 358/462 |
| 5,231,677 | 7/1993 | Mita et al. | 382/22 |
| 5,327,257 | 7/1994 | Hrytzak et al. | 358/447 |
| 5,351,137 | 9/1994 | Kato et al. | 358/457 |
| 5,539,843 | 7/1996 | Murakami et al. | 382/270 |
| 5,608,821 | 3/1997 | Metcalfe et al. | 382/252 |
| 5,696,848 | 12/1997 | Patti et al. | 382/254 |

*Primary Examiner*—Leo H. Boudreau
*Assistant Examiner*—Kanji Patel
*Attorney, Agent, or Firm*—Fitzpatrick, Cella, Harper & Scinto

[57] ABSTRACT

To perform processing to increase the number of pixels of inputted image data, the inputted image data having low resolution is converted to image data having high resolution. For this conversion, one pixel of the low resolution data is interpolated, a difference value between a predetermined value and image data included in an interpolating-pixel block which corresponds to a pixel of interest of the low resolution data, is calculated, and pixel values of pixels in the interpolation-pixel block are determined in accordance with the difference value. Furthermore, multi-level image data on which pixel values have been determined is binarized by the dither method, to determine pixel values such that the smaller the absolute value of the difference value is, the larger the difference from the predetermined value.

22 Claims, 21 Drawing Sheets

FIG. 6

| 1 | 1 | 1 |
|---|---|---|
| 1 | 1 | 1 |
| 1 | 1 | 1 |

FIG. 14
| 7 | 8 | 9 | 10 |
|---|---|---|----|
| 6 | 1 | 2 | 11 |
| 5 | 4 | 3 | 12 |
| 16 | 15 | 14 | 13 |
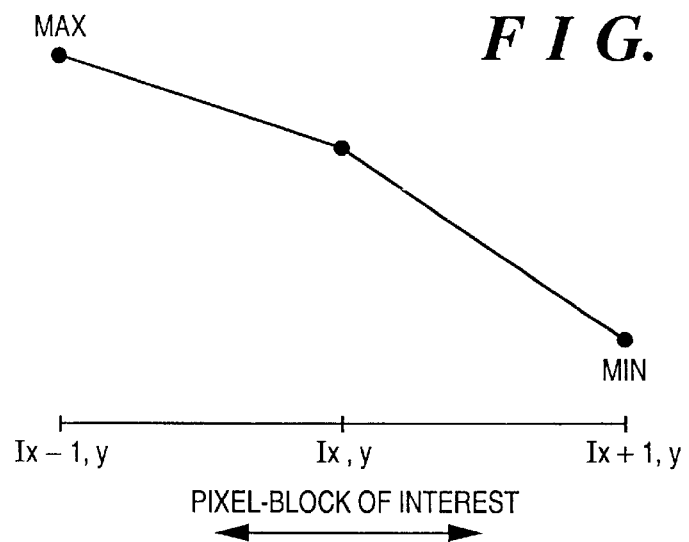
FIG. 15
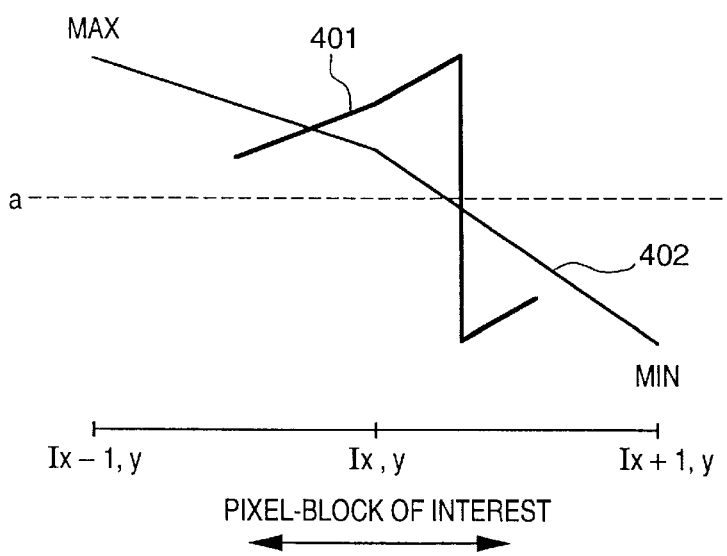
FIG. 16

F I G. 23

| 0 | 0 | 0 |
|---|---|---|
| 0 | 1 | 0 |
| 0 | 0 | 0 |

INTERPOLATING POINT E = (1−i)(1−j)A + i·(1−j)B + j·(1−i)C + ijD

DATA ON WHICH RESOLUTION CONVERSION IS PERFORMED
BY BI-LINER INTERPOLATION METHOD

IMAGE PROCESSING APPARATUS AND IMAGE PROCESSING METHOD

BACKGROUND OF THE INVENTION

Present invention relates to an image processing apparatus for changing the size of the inputted image data in order to convert resolution of the image data from low resolution data to high resolution data.

Conventionally, various methods have been suggested for resolution conversion in order to convert inputted low resolution data to high resolution data. These methods adopt various conversion methods depending upon a type of a subject image (e.g. a multi-level image having tone data for each pixel, a binary image binarized in accordance with a pseudo half-tone processing, a binary image binarized with a fixed threshold value, an image including characters, and the like).

As a conventional interpolation method, for instance, there is the nearest neighbor interpolation method where a pixel value of the nearest neighboring pixel C is utilized as a value of an interpolating point E as shown in FIG. 26, or a bi-linear interpolation method where a pixel value E is determined by the following equation utilizing distances from four pixels (pixel values of four pixels are A, B, C and D) surrounding an interpolation point:

$$E=(1-i)(1-j)A+i\cdot(1-j)B+j\cdot(1-i)C+ijD$$

Note it is assumed that when the distance between pixels is 1, the interpolating pixel is positioned at i from A in a horizontal direction and j from A in a vertical direction.

In a case where image data having low resolution and multiple tones is converted to binary image data having high resolution, for instance, if an image output apparatus, such as a printer capable of outputting only binary values, is to output image data having a resolution corresponding to a printer resolution, data related to the printer resolution may be inputted from a host computer in advance. However, considering mapping process on the host computer, burden of the processing, or time required for transmission, it is also possible to input the data having low resolution so as to generate binary data having high resolution and then output the data. Currently, an error diffusion method is often employed in the pseudo half-tone processing for binarizing a multi-level image. Yet, as resolution of the printer becomes higher, it is more advantageous in terms of processing time, a size of circuit components, and the like to use a dither method rather than the error diffusion method which requires a heavy load of processing. Moreover, in terms of image quality, particularly tonality, a difference of these methods becomes small as high resolution processing is commonly used. Herein, the problem is the resolution. When the dither method is utilized, tonality and resolution are conflicting conditions so that deterioration in a half-tone character portion or an edge portion of a natural image becomes conspicuous. Conventionally, in view of this problem, a method is suggested where binarization is performed by the dither method after an edge emphasizing process is performed.

However, the foregoing conventional method raises the following problem.

The method illustrated in FIG. 26 has an advantage that it is simple in structure. However, if this method is applied to a natural image, a pixel value is determined for each block which is enlarged for interpolation; therefore, the block is visually emphasized, resulting in deterioration of image quality.

Furthermore, when the method is applied to an image including characters, a line image, CG (computer graphics) image or the like, the same pixel values are repeated in each of the enlarged blocks; therefore, resulting in a poor image having a rough edge called a jaggy image, particularly in an oblique line which will be described later with reference to FIGS. 28 and 29. FIG. 28 shows input data, and FIG. 29 shows an example of an image shown in FIG. 28, on which a resolution conversion is performed to obtain an image which is enlarged twice the size of the original one utilizing the nearest neighbor interpolation. The larger magnifying ratio becomes, the more an image deteriorates. Note that numerals 200 and 10 in FIGS. 28 and 29 are pixel values.

The method shown in FIG. 27 is a generally-utilized method for enlarging a natural image. According to this method, the image obtained will be balanced and smoothed; however, in the edge portion or in a portion where sharp quality is particularly required, blurred image quality is obtained. When this method is applied to an image obtained by scanning a map or the like, or a natural image including characters, important information contained in the image may not be conveyed to a user due to the blur caused by the interpolation.

Figures 28, 29, 30:
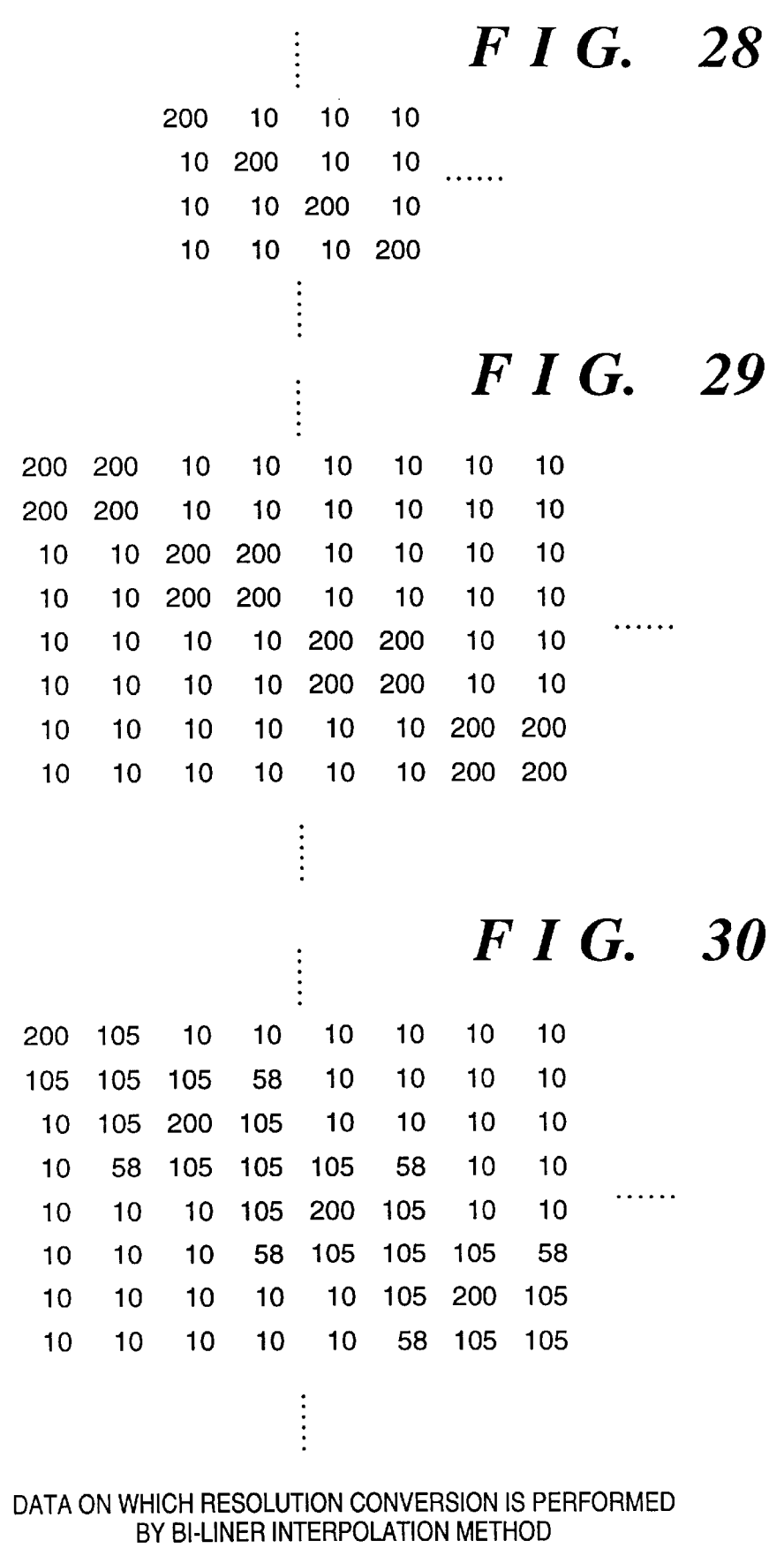

FIG. 30 shows image data on which an interpolation process is performed according to the method shown in FIG. 27 to obtain an enlarged image twice as large as the image data shown in FIG. 28. According to the method, as apparent from process result shown in FIG. 30, pixel values are not uniform not only in the vicinity of an oblique line but also the oblique line itself, thereby resulting in a blurred image.

Further, when both resolution conversion and pseudo half-tone processing are performed, the following problem arises.

When the dither processing is performed on an image on which the resolution conversion shown in FIGS. 26 and 27 has been performed by executing edge emphasizing processing with filtering, the method shown in FIG. 26 makes the jaggedness more apparent. Even by the method shown in FIG. 27, since an edge portion is already blurred, more specifically, pixels in the edge portion are broken due to interpolation processing, the edge emphasizing process does not reproduce an edge which has been sharp enough when resolution of the image is low. Moreover, since filtering is executed after the number of pixels is increased by the resolution conversion, a load for processing increases.

In other words, resolution conversion of a multi-level image raises a problem that favorable resolution conversion, where there is no blur caused by interpolation processing or no jaggedness, cannot be achieved. Furthermore in the processing in which resolution conversion and pseudo half-tone processing are combined, there is a problem that a process pursuing both tonality and resolution cannot be realized.

In Japanese Patent Application Laid-Open, 7-93531, 7-107268 and 7-105359, resolution conversion methods which do not result in jaggedness in an image or a blurred image due to interpolation are suggested, in association with generation of high resolution data based on low resolution data.

The basic idea of the suggested technique is as follows. Components depending upon resolution are removed from inputted original data, then the number of pixels is increased to the number corresponding to a resolution of an image to be outputted, and finally, data appropriate for the newly defined resolution is predicted and generated. The removal of the dependency of inputted resolution can be realized by smoothing processing utilizing an LPF (low pass filter), and an increase in the number of pixels can be realized by linear interpolation. For predicting high resolution data, the interpolated data is simply binarized, and different processing is performed respectively on the pixels binarized as "1" and the pixels binarized as "0", to calculate pixel values to be outputted.

There is also a method of directly calculating output pixel values in a block consisting of pixels to be enlarged in accordance with a predetermined rule, without utilizing the aforementioned interpolation methods.

However, the above suggestions have the following problems. According to the foregoing suggested process, edge generation in high resolution is performed based on binarized data. For paying attention to importance of resolution in high resolution state, it is necessary to generate an edge which has resolution equivalent to a high resolution and calculate a pixel value based on the generated resolution data. However, when the subject image is a natural image or the like, continuity of pixel values is disturbed because of separated processing of edge generations, thereby producing an unnatural image.

SUMMARY OF THE INVENTION

The present invention has been made in consideration of the above situation, and has as its object to provide an image processing apparatus and method thereof, for converting inputted low resolution data to high resolution data, which can realize conversion processing for obtaining excellent image quality without generating a blurred image due to interpolation, which has been particularly pointed out as a disadvantage when dealing with a natural image.

Another object of the present invention is to provide an image processing apparatus and method thereof which can realize conversion processing for obtaining excellent image quality without depending upon the low resolution of original data and without generating any jaggedness.

Another object of the present invention is to provide an image processing apparatus and method thereof where there is no separate processing caused by the conventional threshold processing when generating high resolution data, and where a smooth, natural and clear image is readily generated when handling a natural image.

In order to attain the above objects, the present invention provides an image processing apparatus for converting inputted image data having low resolution to image data having high resolution and performing a process for increasing the number of pixels of the inputted image data, comprising: interpolation means for interpolating a pixel of interest of the image data having low resolution a predetermined number of times; calculation means for calculating a difference value between a predetermined value and image data in a pixel-block corresponding to the pixel of interest, which consists of pixels interpolated by the interpolation means; and determination means for determining pixel values for the pixels in the pixel-block in accordance with the difference value.

Further, in order to attain the above objects, the present invention provides an image processing apparatus for converting inputted image data having low resolution to image data having high resolution and increasing the number of pixels of the inputted image data, comprising: detection means for detecting m (m≧1) number of pixels (note that a pixel value of a pixel at an observation point n included in m number of pixels is P(n)) from neighboring pixels of a pixel of interest of the image data having low resolution; interpolation means for interpolating the pixel of interest a predetermined number of times in accordance with the image data having low resolution, and calculation means for calculating an output value h(k) by performing $$h(k) = \sum_{n=1}^{m} \alpha(n)P(n) = \beta C(k)$$

($\alpha(n)$ and $\beta$ are arbitrary coefficients and $$\sum_{n=1}^{m} \alpha(n) \neq 0$$

and $\beta \neq 0$)
in accordance with an interpolation value C(k) at an interpolation point k obtained by the interpolation means.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 6 is a diagram showing an example of LPF (low pass filter) for smoothing process;

FIG. 14 is a diagram showing an example of a dither matrix;

FIGS. 15 and 16 are graphs describing edge processing according to the third embodiment;

FIG. 23 is a diagram showing an example of a filter;

FIG. 28 shows input data;

FIG. 29 shows a process result obtained by the conventional nearest neighbor interpolation method; and FIG. 30 shows a process result obtained by the conventional bi-linear interpolation method.

DETAILED DESCRIPTION OF THE PREFERRED EMBODIMENTS

Preferred embodiments of the present invention will be described in detail in accordance with the accompanying drawings.

<First Embodiment>

Figure 1:
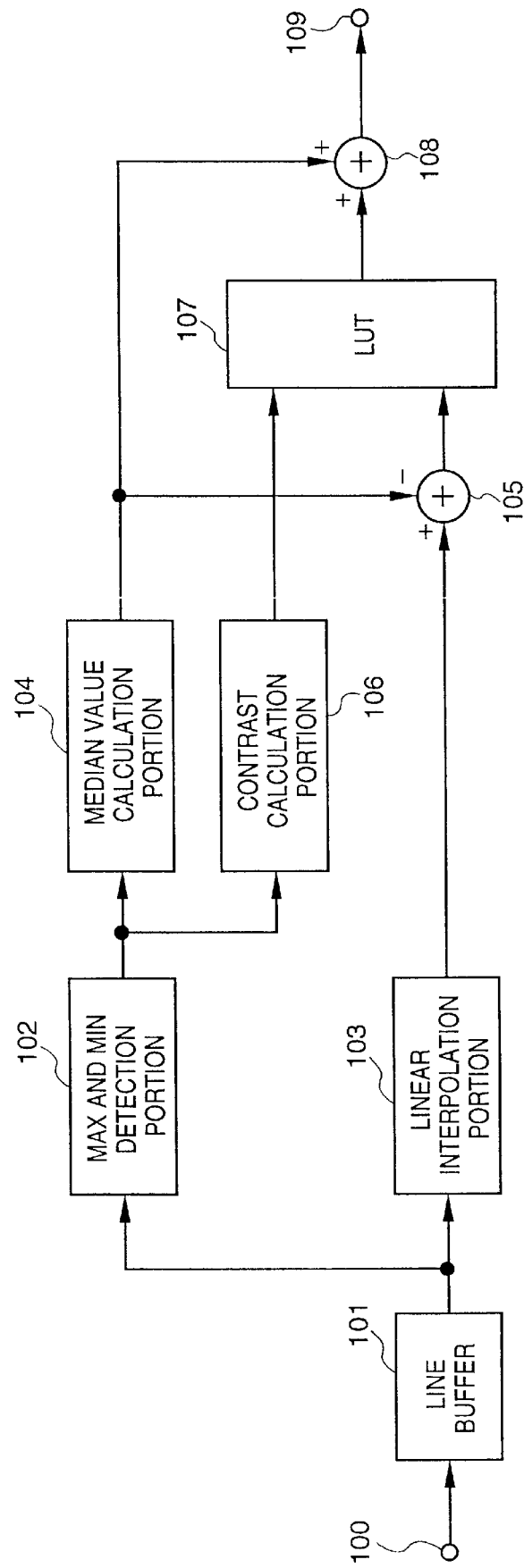
FIG. 1 is a block diagram showing a main part of an image processing apparatus according to a first embodiment of the present invention.

FIG. 1 is a block diagram showing a main part of the image processing apparatus according to the first embodiment of the present invention. It is efficient that this image processing apparatus should be equipped in an image output apparatus such as mainly a printer. It may also be incorporated inside an image processing apparatus other than the image output apparatus, or a host computer, for providing an application software for realizing a function thereof.

With reference to FIG. 1, operation steps of the image processing apparatus according to the present embodiment will be described. Herein, descriptions will be given as an example where data corresponding to a pixel of interest in the inputted image data is converted to data having a number of pixels which are obtained by increasing the data by N times in the vertical direction and M times in the horizontal direction.

In FIG. 1, reference numeral 100 denotes an input terminal of the apparatus to which image data having low resolution is inputted. Several lines of lines corresponding to the inputted low resolution data are stored and held in a line buffer 101. Based on the several lines of image data, window processing is performed in an X×Y-pixel unit having a pixel of interest at its center position. Reference numeral 102 denotes a MAX and MIN detection portion for detecting a maximum value and a minimum value of image data within the above window.

Reference numeral 103 denotes a linear interpolation portion. Centering on the pixel of interest, pixels originally sampled are interpolated by the above bi-linear interpolation process (hereinafter referred to as a linear interpolation process), thus generating interpolation data corresponding to pixels obtained by multiplying the pixel of interest N times in the vertical direction and M times in the horizontal direction.

Reference numeral 104 denotes a median value calculation portion where a median value a is calculated from the detected MAX and MIN values utilizing the following equation (1).

$$a=(MAX+MIN)/2 \quad (1)$$

Reference numeral 105 denotes an adder where a difference value b which is a difference between the linear interpolation data and the median value a, is calculated in a block of N×M pixels (hereinafter referred to as a pixel-block of interest) which corresponds to the pixel of interest. Herein, assuming that the linear interpolation data in the pixel-block of interest is DATA(i, j), the difference value b(i, j) for each pixel can be calculated by the following equation (2).

$$b(i,j)=DATA(i,j)-a \quad (2)$$

Reference numeral 106 denotes a contrast calculation portion where a contrast value c in X×Y pixels is calculated from the detected MAX and MIN values utilizing the following equation (3).

$$C=MAX-MIN \quad (3)$$

The contrast value c and the difference value b(i, j) calculated in the foregoing manner are transmitted to an LUT (look-up table) 107 and a predetermined value is outputted in accordance with a relative relationship between the edge contrast in the aforementioned window and the difference value. In relation to a memory capacity utilized for the LUT and its cost, it is also practical to quantize data for the contrast value c and the difference value b(i, j) at the time of inputting the data to the LUT, for the purpose of reducing number of bits. The value thus converted is outputted from the LUT to be added to the median value a by an adder 108, and the added value is transmitted to an output terminal 109, thereby outputting to a printer engine (not shown) or the like.

Next, generation of an edge having high resolution according to the first embodiment will be described with reference to FIGS. 2 to 4.

Figure 2:
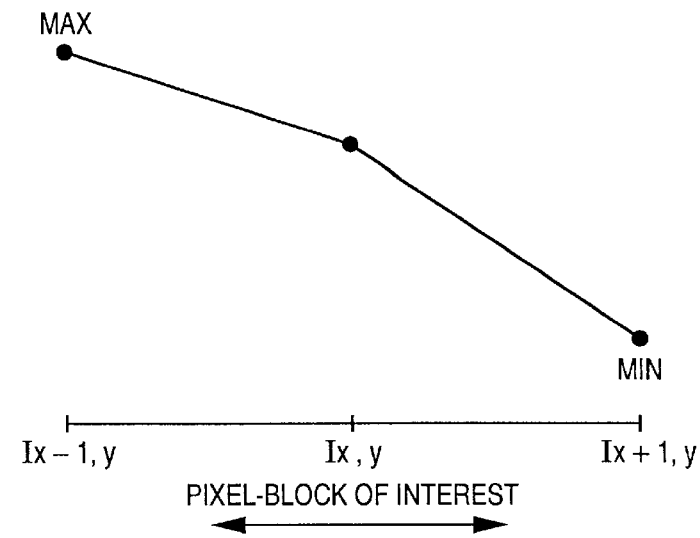
FIGS. 2 and 3 are graphs describing generation of an edge having high resolution according to the first embodiment.

In FIG. 2, the mark ● denotes a pixel value in a window. To facilitate descriptions, values here are described in one-dimensional direction, and it is assumed that neighboring pixels (Ix−1, y) and (Ix+1, y) of a pixel of interest (Ix, y) are the MAX value and MIN value respectively. A solid line drawn from the MAX value to the MIN value denotes linear interpolation data. A region indicated by an arrow centered on the pixel of interest (Ix, y) denotes the range of a pixel-block of interest subjected to generate high resolution data.

Figure 3:
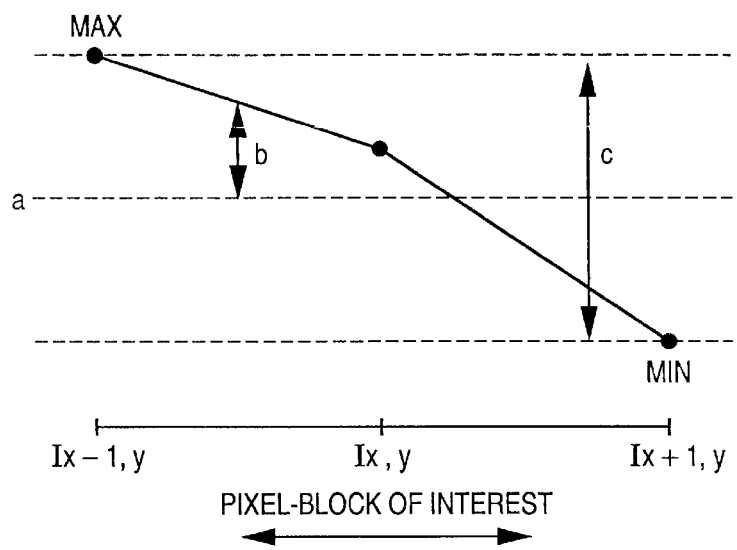

In FIG. 3, the median value a ((MAX+MIN)/2) calculated from the detected MAX and MIN values is indicated by a dashed line. A difference value between linear interpolation data and the median value a is indicated by an arrow b, and a contrast of the MAX and MIN values is indicated by an arrow c.

According to the first embodiment, generation of data in the pixel-block of interest having high resolution in accordance with the relative relationship of the above described values b and c, is based upon the following logic.

Since the dashed line a indicates a median value of MAX and MIN values as described above, it is considered a center of an edge in the window. Because interpolation is linear, as a pixel value of interpolation data comes close to the value indicated by the line a in a density direction, that is, as the difference value b approaches 0, it approaches the center of an edge in terms of a spatial distance. In other words, the distance in the density direction is substituted by a spatial distance.

If a sharp edge in a natural image or the like results in a blurred edge due to linear interpolation, a sharp edge must be generated even for high resolution data. As described above, the change of the difference value b corresponding to the density direction is substituted by a spatial distance from the center of an edge. Therefore, the LUT which stores appropriately converted values corresponding to the difference value, can be designed to generate a sharper edge angle as the difference value b approaches 0, in other words, as it reaches closer to the center of the edge.

Further, not only by a relative value to the difference value b but also by an absolute value of the contrast value c, whether original data having low resolution corresponds to an edge portion where contrast is large, or to a plain portion, can be readily determined by inputting contrast data of the MAX and MIN values into the LUT. If the original data corresponds to the plain portion, edge generation is not necessary, and sharpness of an edge having high resolution can be controlled depending on a size of an edge associated with the original data. Note that a value of the LUT may be optimized with an output engine and experimentally calculated.

Adoption of the LUT, enables flexible generation of an edge which is non-linear in the density direction. Further, since an output from the LUT does not include a pixel value which will be considered as an unconditional value, a pixel value having high resolution can be generated by adding an unconditional value a.

Figure 4:
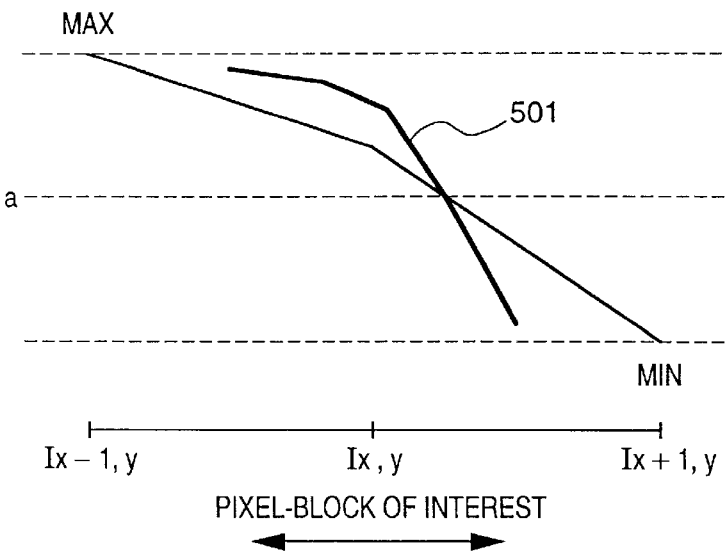
FIG. 4 is a graph showing a process result when a high resolution edge is generated according to the first embodiment.

FIG. 4 shows a process result obtained when a high resolution edge is generated based on an output of an actual LUT. In FIG. 4, a bold line 501 denotes data corresponding to a sharp edge, which is newly generated in a pixel-block of interest.

As has been described above, effective generation of high quality image data of high resolution is possible by calculating a difference value between a constant value and image data in an interpolated pixel block, which corresponds to a pixel of interest having low resolution data, and by determining a pixel value in the interpolated pixel block based on the calculated difference value.

Moreover, the median value a, which is a constant value, can be dynamically obtained from the MAX and MIN values, therefore, the center of an edge can be readily determined.

The foregoing descriptions have been given with an assumption that a fixed value a is a median value obtained by the equation (1), however, the value a is not limited to the above example as a matter of course. Even it is set that a=MAX or a=MIN, the equivalent processing to that described above can be performed, since the relative relationship between values b and c calculated by the equations (2) and (3) is the important factor. To provide an example, if it is set that a=MIN, value b which is a difference value between a linear interpolation value and the MIN value, and value c indicative of a contrast are both inputted into the LUT, and an output value of the LUT is added to the MIN value. Accordingly, generation of data having high resolution is possible.

Note that in the above described embodiment, high resolution data is generated by utilizing the LUT; however, as long as edge generation is realized by simple calculations, the present invention is not limited to generation of data using the LUT. For example, calculation can be done by utilizing the difference value b as an evaluation function. The size of a window utilized for the processing may be variable so that peaks indicative of the maximum and minimum values of the edge are always included therein. Further, depending on a capacity of the LUT, three types of values: the MAX value, the MIN value and the difference value b, may be inputted to the LUT in order to determine a pixel value of the pixel-block of interest.

<Second Embodiment>

Hereinafter, a second embodiment of the present invention will be described.

According to the second embodiment, descriptions will be provided for a method particularly effective in processing characters mapped on a host computer or a line image or the like, for making it higher resolution. Moreover, this embodiment is effective to the present invention especially when a tone level in the above described window is two.

As has been described above, if a character image or a line image mapped and generated in low resolution is processed by the conventional interpolation method, it results in occurrence of jaggedness. To solve this problem, for an inputted image such as a character or line image, a method has been suggested where edge data in low resolution is changed by a smoothing filter to obtain a "resolution free" state, and a linear interpolation is applied to the image to obtain a desired number of pixels, then an edge corresponding to the resolution is newly generated.

In view of the above situation, according to the present embodiment, an edge emphasizing process is performed by utilizing the aforementioned substitution of a distance in the density direction for a spatial distance.

Figure 5:
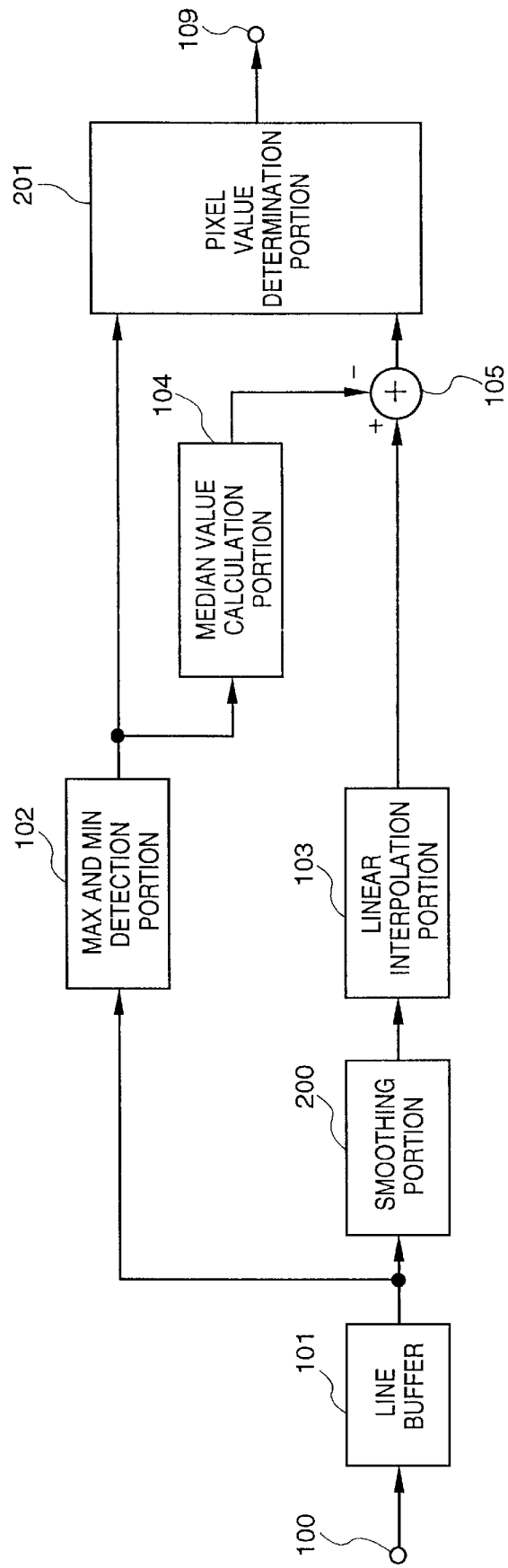
FIG. 5 is a block diagram showing a main part of an image processing apparatus according to a second embodiment.

FIG. 5 is a block diagram showing a main portion of an image processing apparatus according to the second embodiment. In FIG. 5, the same reference numerals are assigned to those components identical to the image processing apparatus shown in FIG. 1, and the description will be given for those portions that are different from those shown FIG. 1.

In FIG. 5, low resolution data inputted by the input terminal 100 is stored in the line buffer 101, and a window is generated to surround a pixel of interest, based on several lines of the inputted data. The maximum and minimum values of data in the window are detected by the MAX and MIN detection portion 102, and a median value a is calculated by the median value calculation portion 104, utilizing the above equation (1).

Figure 6:
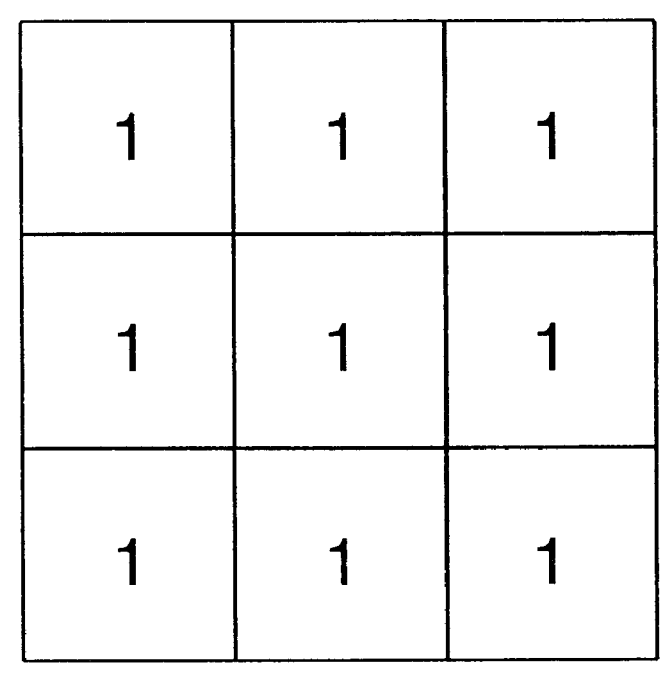

Meanwhile, reference numeral 200 denotes a smoothing portion where smoothing process is performed by an LPF (low pass filter) shown in FIG. 6 utilizing the data in the window. Needless to say, the filter is not limited to that shown in FIG. 6.

The low resolution data on which the smoothing process has been performed is in the state where the edge is blurred. In this state, the pixel of interest is interpolated to an N×M pixels by the linear interpolation portion 103.

Reference numeral 105 denotes an adder where a difference value b indicative of a difference between the linear interpolation data on which smoothing process has been performed and the median value a is calculated in a block consisting of N×M pixels (hereinafter referred to as a pixel-block of interest), which correspond to a pixel of interest. Assuming that the linear interpolation data, on which the smoothing process has been performed, in the pixel-block of interest is FILT (i, j), the difference value b(i, j) for each pixel can be calculated by the following equation (4).

$$b(i,j)=\text{FILT}(i,j)-a \qquad (4)$$

The detected MAX and MIN values and the difference value b(i, j) are transmitted to a pixel value determination portion 201 and the determined pixel value is transmitted to the output terminal 109, thus being outputted to a printer engine (not shown) or the like.

Figure 7:
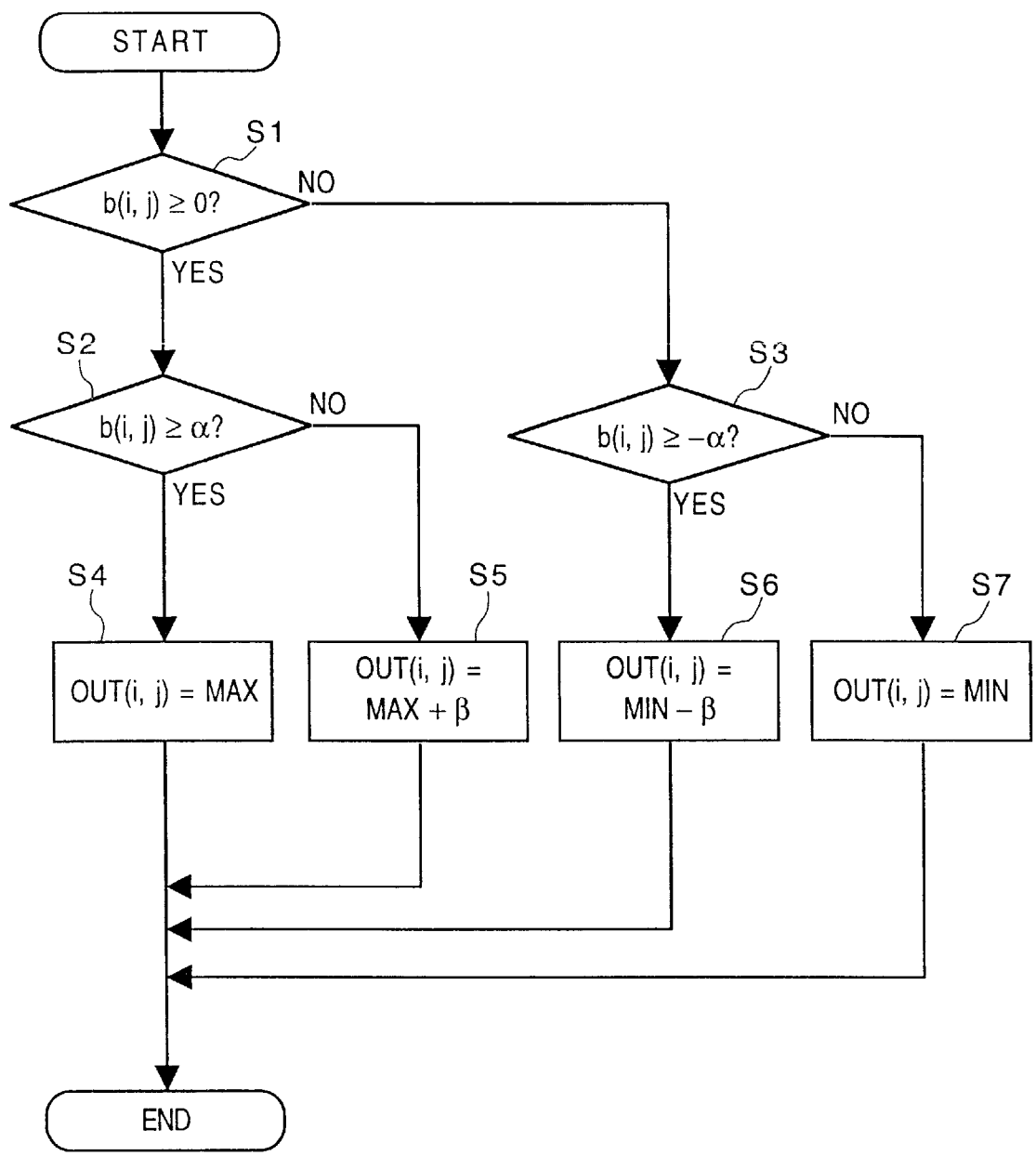
FIG. 7 is a flowchart showing operation steps of a pixel value determination portion according to the second embodiment.

FIG. 7 is a flowchart showing operation steps of the pixel value determination portion 201 according to the second embodiment. In FIG. 7, whether or not the difference value b(i, j) is 0 or more is determined in step S1. When the difference value is 0 or more comparison is made with a predetermined positive value α in step S2. When the difference value is a negative value, on the other hand, comparison is made with a value -α in step S3.

In other words, in steps S2 and S3, determination is made for whether or not the difference value b(i, j) is within ±α, that is, the b(i,j) is between 0 and +α and between 0 and -α.

If determination is made that the difference value is over α in step S2, the pixel value determination portion 201 outputs the MAX value as an output value OUT(i, j) in step S4. If it is determined that the difference value is over 0 but less than α, the pixel value determination portion 201 adds a predetermined positive value β to the MAX value and outputs thereof in step S5. Meanwhile, if it is determined that the difference value is over -α but less than 0 in step S3, a value obtained by subtracting the aforementioned value β from the MIN value is outputted (step S6). If the difference value is less than -α, the MIN value is outputted (step s7).

Next, generation of an edge having high resolution, according to the second embodiment, will be described with reference to FIGS. 8 to 10.

Figure 8:
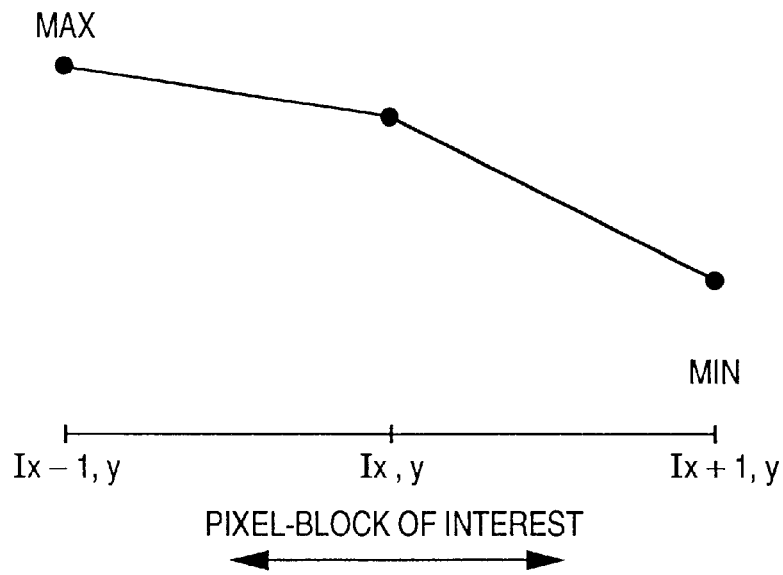
FIGS. 8 and 9 are graphs describing generation of an edge having high resolution according to the second embodiment.

In FIG. 8, the mark ● denotes a pixel value in a window on which smoothing process has been performed. Similar to FIG. 2, just for brevity, values are described in FIG. 8 in one-dimensional direction, and it is assumed that pixel values of pixels (Ix-1, y) and (Ix+1, y) neighboring a pixel of interest (Ix, y) before the smoothing process is performed, are the MAX value and MIN value respectively. A solid line drawn between the pixels denotes linear interpolation data after processing smoothing. An area indicated by an arrow having the pixel of interest (Ix, y) at its center is the area corresponding to a pixel-block of interest subjected to generation of high resolution data.

Figure 9:
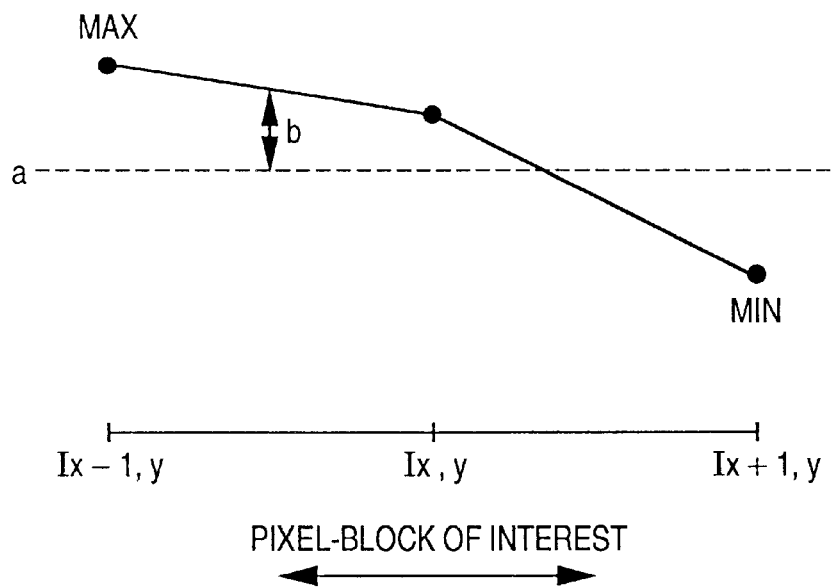

In FIG. 9, the median value a ((MAX+MIN)/2) calculated from the detected MAX and MIN values is indicated by a dashed line. A difference value between linear interpolation data and the median value a is indicated by an arrow b. FIG. 10 shows a result of the process shown in FIG. 7.

Figure 10:
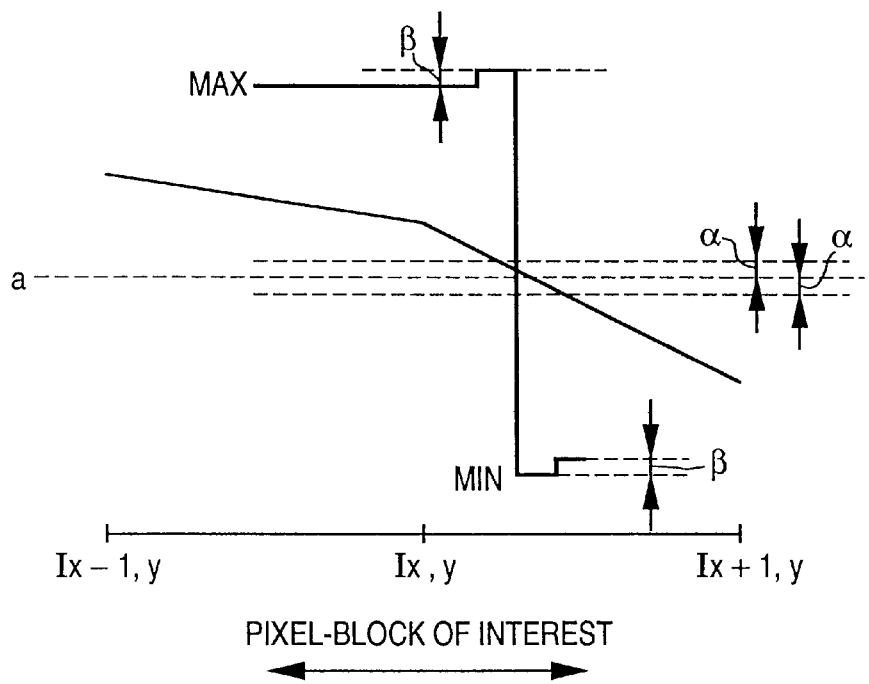
FIG. 10 is a graph showing a process result when a high resolution edge is generated according to the second embodiment.

In FIG. 10, the bold line denotes an output from the pixel value determination portion 201. The output pixel value in an area where the difference value b is near 0 is emphasized, and other pixel values are substituted by the MAX and MIN values. Similar to the logic described in the first embodiment, a spatial distance from the edge portion is determined based upon the difference value b and edge emphasis is performed on high resolution data to be generated.

Performing the edge emphasis on the data on which smoothing process has been performed is to eliminate an edge in low resolution. The generated data results in an image having an emphasized edge without jaggedness. If the edge emphasis is to be performed on the generated high-resolution data utilizing an HPF (high pass filter), filtering must be executed for pixels increased by multiplying N×M times.

Figure 11:
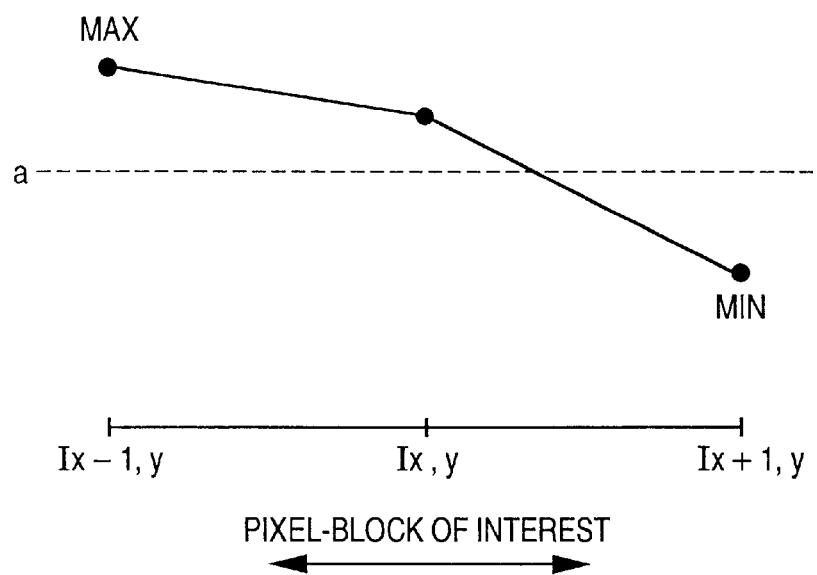
FIGS. 11 and 12 are graphs illustrating an example where an edge generation method according to the second embodiment is applied to extract an edge.
Figure 12:
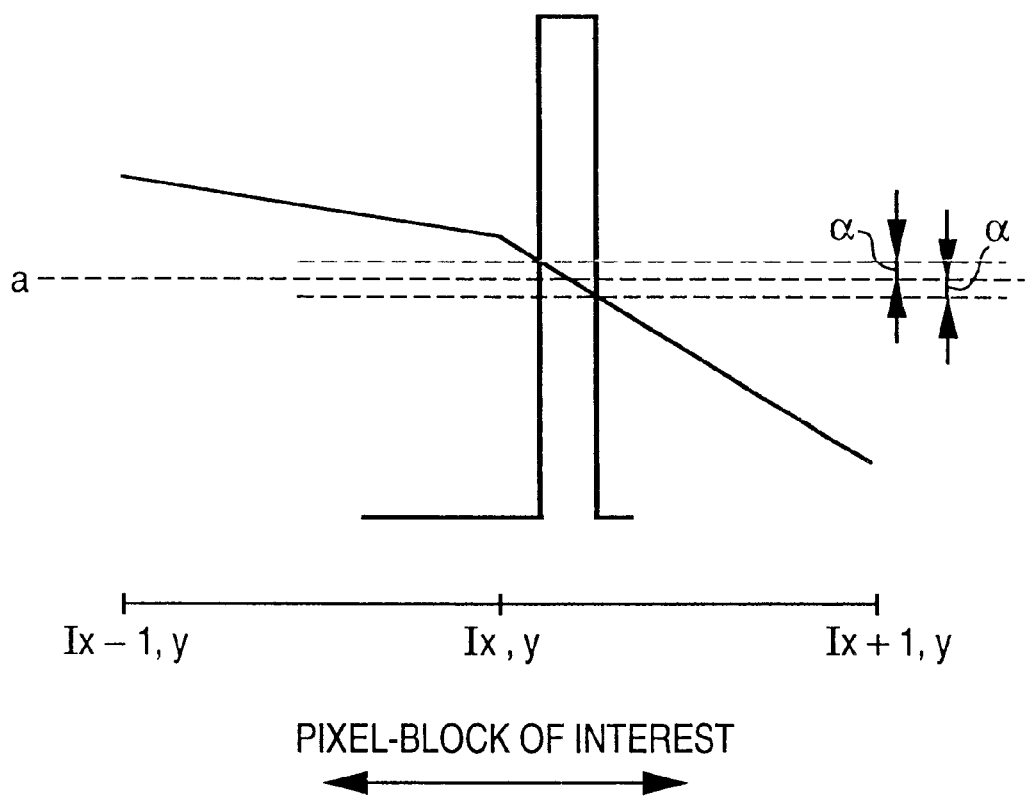

FIGS. 11 and 12 show an example in which utilizing the edge generation method according to the second embodiment is used to extract an edge. Particularly, as shown in FIG. 12, an image from which an edge is extracted can be readily generated by extracting only a portion where the difference value is near 0 (in the range of ±α) and setting a value extremely different from the other portion.

As has been described above, by relatively substituting a distance from the center of an edge in the density direction with a spatial distance, and by performing edge emphasizing process for data on which smoothing process has been performed, jaggedness in an image, which causes problems in resolution conversion of an image having characters or a line image, can be prevented, thereby realizing resolution conversion for an image having high image quality and a clear edge.

In the second embodiment, similar to the first embodiment, a method utilizing the LUT may be also adopted. That is, by adding a smoothing portion to the first embodiment and substituting the equation (2) with the equation (4), generation of a non-linear edge in a density direction can be realized. Alternatively, processing according to a contrast value may be performed, by calculating a contrast value based on the MAX and MIN values. Values of α and β may be experimentally obtained; particularly a value β may be altered in accordance with the contrast of the MAX and MIN values.

<Third Embodiment>

The third embodiment of the present invention will be described.

Figure 13:
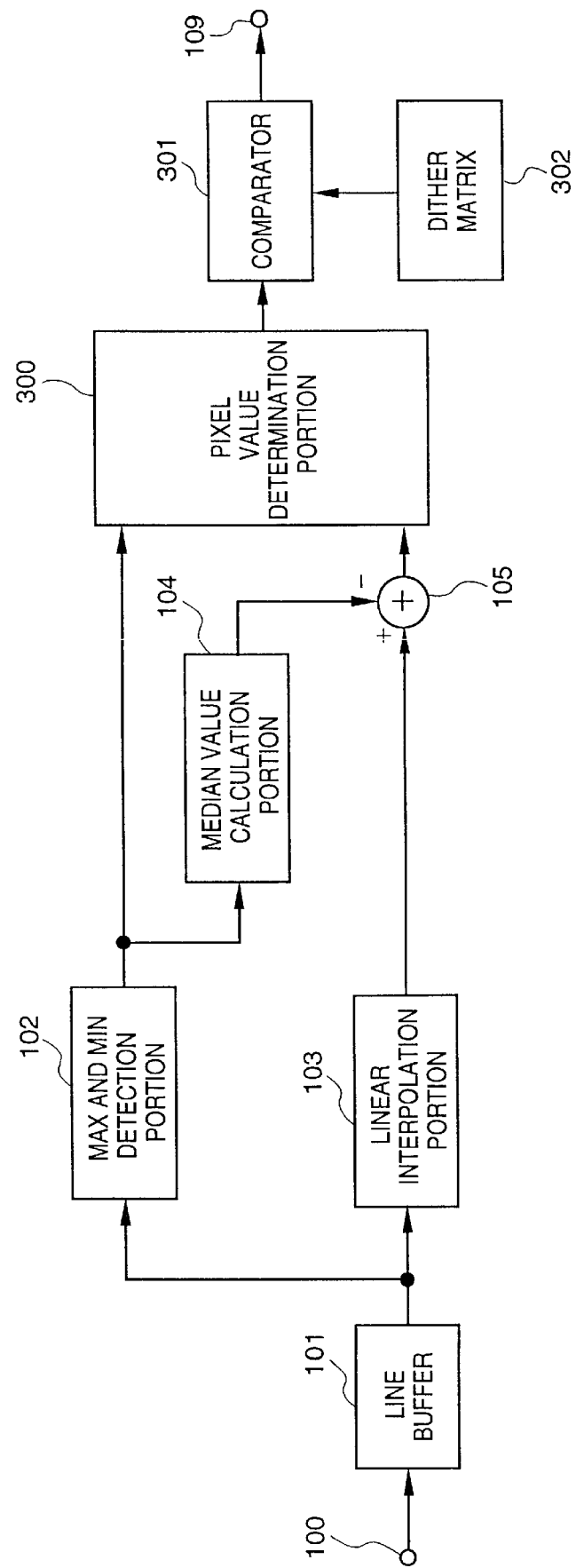
FIG. 13 is a block diagram showing a main part of an image processing apparatus according to a third embodiment.

FIG. 13 is a block diagram showing a main part of an image processing apparatus according to the third embodiment. In FIG. 13, the same reference numerals are assigned to those components identical to the image processing apparatus shown in FIG. 1, and descriptions will be given, only for those portions that are different from FIG. 1.

In FIG. 13, low resolution data inputted from the input terminal 100 is stored in the line buffer 101, and a window is generated to surround a pixel of interest, based on several lines of the inputted data. The maximum and minimum values of data in the window are detected by the MAX and MIN detection portion 102, and a median value a is calculated by the median value calculation portion 104, utilizing the above equation (1).

Meanwhile, as for image data in the window, a pixel of interest is interpolated to N×M pixels by the linear interpolation portion 103. The adder 105 performs calculation of a difference value b indicative of a difference between linear interpolation data and the median value a in a block consisting of N×M pixels (hereinafter referred to as a pixel-block of interest), which correspond to a pixel of interest, utilizing the above described equation (2).

The detected MAX, MIN values and the difference value b(i, j) are transmitted to a pixel-value determination portion 300, and a pixel value determined by the pixel-value determination portion 300 is sent to a comparator 301 where comparison is made with a binarized threshold-value output generated based upon a dither matrix (see 302 in FIG. 13) as shown in FIG. 14. In other words, binarization is performed utilizing a dither signal as a threshold value, the comparison result obtained by the above process is transmitted to the output terminal 109 and outputted to a printer engine (not shown) or the like.

In the pixel-value determination portion 300, the MAX, MIN values and the difference value b(i, j) are inputted, and the following calculation is performed.

$$\text{OUT}(i,j)=\text{MAX}-b(i,j), \text{ if } b(i,j) \geq 0, \text{ OUT}(i,j)=\text{MIN}-b(i,j). \text{ if } b(i,j)<0, \quad (5)$$

FIGS. 15 and 16 are graphs for describing edge processing according to the third embodiment. In FIG. 15, the mark ● denotes a pixel value in the window. Similar to FIG. 2, in order to facilitate descriptions, values are described in FIG. 15 in one-dimensional direction, and it is assumed that pixels values of pixels (Ix-1, y) and (Ix+1, y) neighboring a pixel of interest (Ix, y) are the MAX value and MIN value respectively. A solid line drawn from the MAX value to the MIN value in FIG. 15 denotes linear interpolation data. An area indicated by an arrow having the pixel of interest (Ix, y) at its center is the area corresponding to a pixel-block of interest subjected to generation of high resolution data.

In FIG. 16, the median value a ((MAX+MIN)/2) calculated from the detected values MAX and MIN is indicated by a dashed line. A bold line 401 denotes an output from the aforementioned pixel-value determination portion 300 (actually, the output is not continuous at b(i, j)=0, but for brevity, it is shown by the continuous solid line).

As apparent from FIG. 16, in each of a portion where the difference value b is positive and a portion where the value b is negative, linear interpolation data and the bold line (indicating actual output) are in a relationship of a reflective image. The locus of the bold line (401) largely differs from the locus of the linear interpolation data (402). As a distance from an edge becomes short, contrast of the output value increases.

The generation of such edge portion is based upon the following logic.

According to the present embodiment, since an output value from the pixel-value determination portion 300 is not a final output value, an edge should be generated so that it becomes advantageous when the dither method is applied in a later stage. Suppose that the bold line 401 shown in FIG. 16 indicates the final output, generated data for the pixel-block of interest would lack continuity with the neighboring pixel block which is similarly generated, therefore, anticipated is a considerable image deterioration.

However, when the dither method, particularly when a dither matrix which is larger than an enlargement magnification of (N×M) is utilized, it is desirable to realize an edge with a shape where a density of the pixel of interest in low resolution is maintained to its best level, and where dots are concentrated on the edge portion in high resolution. In other words, since contrast changes in accordance with a distance from the edge, deterioration due to the dither method is less near the edge portion, but becomes significant as a distance from the edge is greater.

In other words, in the pixel-block of interest to be generated, a portion where resolution is prioritized consists with a portion where tonality is prioritized, according to the present embodiment.

As set forth above, compared to the edge emphasizing process where filtering is performed after high resolution edge is generated, performing tone processing utilizing the dither method after a pixel value is determined, realizes an original image with less density variance, consistence of resolution with tonality, and generation of an excellent binary image.

In the case where an error diffusion method is used for binarization instead of the organizational dither method, a sharp edge portion may lack a few dots. Therefore, if utilization of the error diffusion method for binarization is known to a user beforehand, it is effective to generate a slightly blurred edge, as oppose to the case in which the organizational dither method is used.

<Fourth Embodiment>

Figure 17:
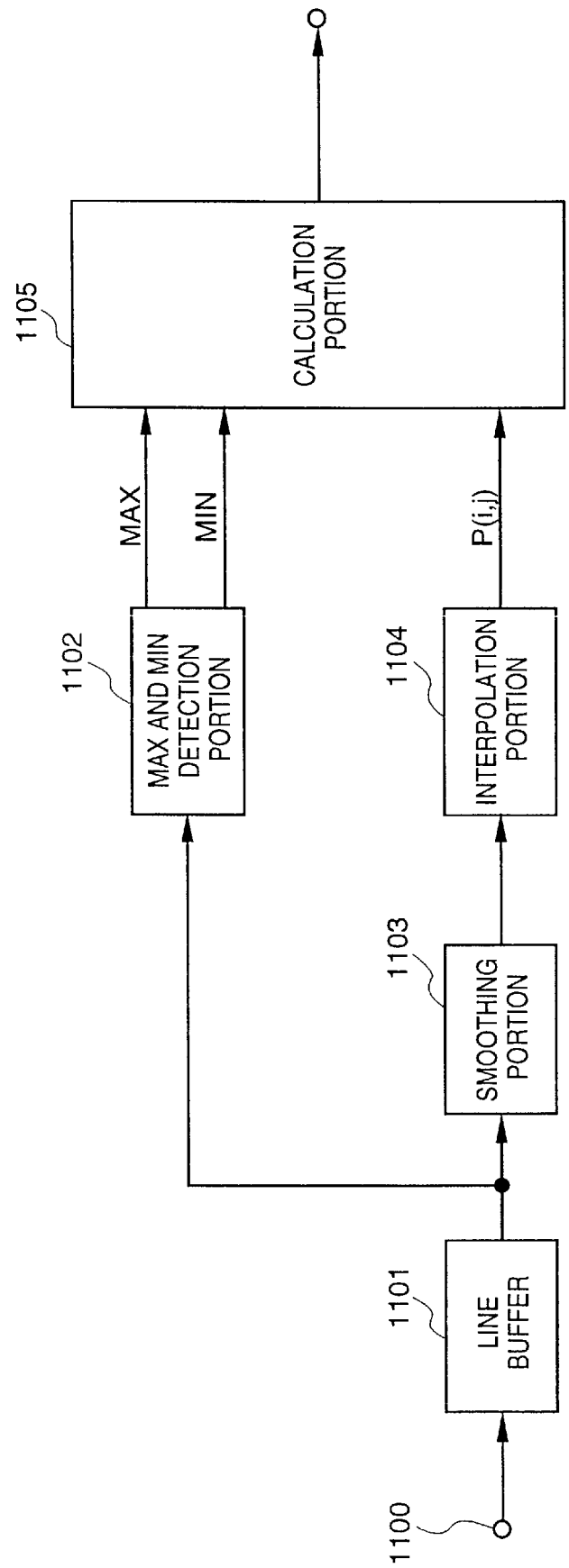
FIG. 17 is a block diagram showing a main part of an image processing apparatus according to a fourth embodiment.

FIG. 17 is a block diagram showing a main part of an image processing apparatus according to the fourth embodiment. The image processing apparatus according to the fourth embodiment operates effectively when it is incorporated inside an image output apparatus such as a printer connected mainly to a computer, or a video printer or the like which inputs video signals. It is also possible to incorporate the processing steps provided by the present apparatus into an image processing apparatus other than the image output apparatus, as an application software in a host computer, or a printer-driver software for outputting data to a printer.

Operation steps of the apparatus according to the fourth embodiment will be described with reference to the block diagram shown in FIG. 17. An example is provided for converting a pixel of interest of inputted image data to data having a number of pixels multiplied by N times in the vertical direction and M times in the horizontal direction.

In FIG. 17, reference numeral 1100 denotes an input terminal where low resolution image data is inputted. Data corresponding to several lines of the low resolution data is stored and maintained in a line buffer 1101. With the several lines of the image data, processing is performed in window units, each of which consisting of plural neighboring pixels including the pixel of interest. Reference numeral 1102 denotes a MAX and MIN detection portion for detecting a maximum value and a minimum value from image data in the window. Reference numeral 1103 denotes a smoothing portion where each pixel in the window is filtered by an LPF (low pass filter). Note that the filter utilized for smoothing in the present embodiment is the same as shown in FIG. 6, in which high frequency components are cut off by taking an average of neighboring nine pixels including a pixel of interest, centered on the pixel of interest.

Reference numeral 1104 denotes an interpolation portion. Centered on the pixel of interest, originally sampled pixels are interpolated by the bi-linear interpolation process (linear interpolation process), and interpolation data for interpolation points corresponding to N pixels in the vertical direction and M pixels in the horizontal direction, is generated. For the neighboring pixels utilized in multiplication and addition for the linear interpolation, pixel values on which filtering process has been performed are used. For instance, when a 3×3 filter shown in FIG. 6 is utilized, the line buffer 1101 having the capacity for five lines is enough to perform filtering not only on a pixel of interest but also on the neighboring eight pixels utilized for multiplication and addition.

Reference numeral 1105 denotes a calculation portion where a predetermined calculation is performed utilizing three types of signals: the detected MAX and MIN values and an interpolation value P(i, j) at an interpolation point (i, j) ($0 \leq i \leq N$, $0 \leq j \leq M$) which is calculated by the interpolation portion, and a new output value is obtained.

The calculation portion 1105 performs multiplication and addition, and calculates an output value D(i, j) at the interpolation point (i, j) utilizing the following equation (6).

$$D(i,j) = a \times \text{MAX} + b \times \text{MIN} + c \times P(i,j) \qquad (6)$$

(a, b and c are predetermined coefficients)

When the above calculation is executed for N×M times, generation of high resolution data for one pixel of interest is completed.

With the above described configuration, high resolution data is generated from low resolution data following the manner described below.

Figure 18:
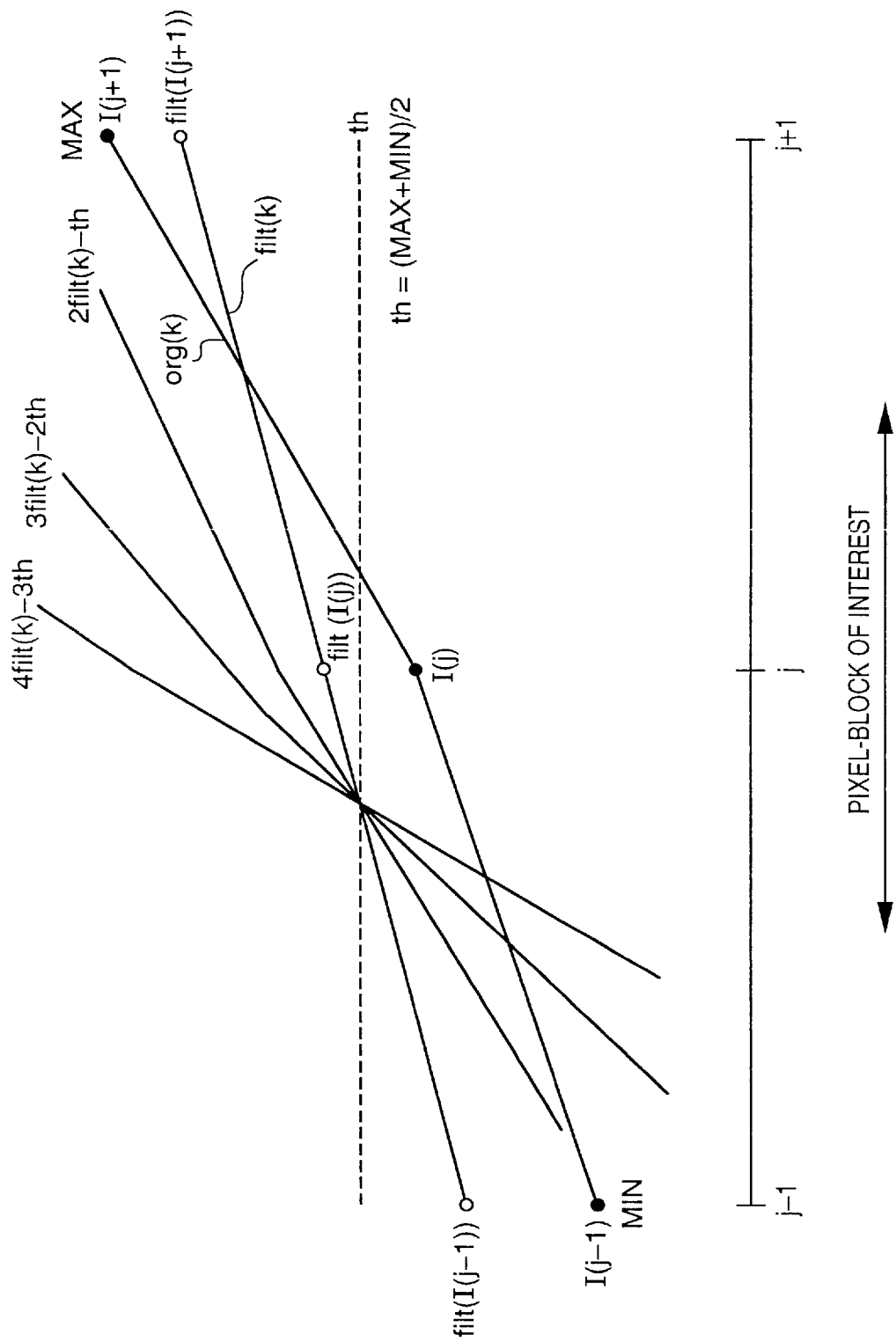
FIGS. 18 and 19 are graphs describing generation of an edge having high resolution according to the fourth embodiment.

FIG. 18 is a graph for briefly describing an interpolation calculation according to the present embodiment, in terms of one dimension. In FIG. 18, the direction of a horizontal axis corresponds to one dimensional coordinate space. A pixel of interest is indicated by j and its neighboring pixels in a preceding position or following position are indicated by (j−1) and (j+1). With respect to the pixel of interest j, a block of pixels subjected to generation of data by magnification is referred to as a pixel-block of interest. More specifically, pixel values for the pixel-block of interest are generated based on one pixel of interest. The vertical axis indicates a depth of a pixel value, and a point indicated by the mark ● denotes pixel values of original data corresponding to a pixel of interest and its neighboring pixels, which are indicated by I(j), I(j−1) and I(j+1) respectively. Suppose that an edge is formed by the neighboring pixels and a pixel of interest is internally located in the edge. A line formed by connecting points which are obtained by the linear interpolation process and corresponds to the pixel values of original data in terms of the pixel of interest and the neighboring pixels, is referred to as org(k) (k is a coordinate value indicative of a spatial interpolation point).

In order to generate a high resolution edge without jaggedness when generating high resolution data, the generation should not be influenced by inputted original data. More specifically, an edge portion to be generated should not depend upon an observation point indicated by ● and the line org(k) formed by the linear interpolation process. Instead, the original data is smoothed by the LPF. In FIG. 18, each mark ○ indicates a pixel value for the pixel where smoothing process is performed on the pixel of interest and its neighboring pixels (these values are respectively referred to as filt(I(j)), filt(I(j−1)), filt(I(j+1))). A line obtained by connecting the smoothed marks ○ by the linear interpolation is indicated by filt(k). A high resolution edge is generated in accordance with the filt(k). The filt(k) represents a locus of density transition having less contrast in the depth direction compared with the org(k). A dashed line denotes an average of the maximum value (MAX) and minimum value (MIN) of the neighboring pixels and is referred by th. That is:

$$th = (MAX+MIN)/2 \quad (7)$$

In the aforementioned generation of high resolution data according to the conventional art, the processing is separated based upon a value greater than the average value th or upon a value smaller than the th. By virtue of the separated processing, an edge is generated having new resolution. However, as described above, the separation of processing leads to a loss of continuity in terms of the locus of a density value in the depth direction. In case of an image generated artificially by a computer, such loss of continuity may not be a drawback. However for a natural image, the loss of continuity produces an unattractive image quality.

Here, by altering the density transition line, filt(k), generation of new edge in high resolution is realized in accordance with a continuous locus. As mentioned above, the density transition line, filt(k), has a characteristic representing a decreased contrast. Herein, the transition line is rotated, centered on the edge portion, such that the inclination of the line becomes steep. The degree of this alteration of the density transition line is calculated by extrapolation of the density transition line, filt(k), and the horizontal line th. Assuming that a transition line for converting the inclination to a steep one is h(k), it is expressed by the following equation.

$$h(k) = a \times \text{filt}(k) - (a-1) \times th \quad (8)$$

From the equations (7) and (8), the following equation can be obtained.

$$h(k) = a \times \text{filt}(k) - (a-1) \times (MAX+MIN)/2 \quad (9)$$

By rearranging the equation (9), the following equation is obtained.

$$h(k) = a \times \text{filt}(k) + (-(a-1)/2)) MAX + (-(a-1)/2)) MIN \quad (10)$$

Accordingly, the following equation (11) is obtained.

$$h(k) = a \times \text{filt}(k) + b \times MAX + c \times MIN \quad (11)$$

where a+b+c=1.

FIG. 18 shows density transition lines, h(k), in case of a=2, 3 or 4. Each of the filt(k) has a steep inclination, intersecting the horizontal line th as the base line. In other words, the spatial coordinate position at the center of an edge is not changed compared with the filt(k), but only the angle of the density transition is changed.

Figure 19:
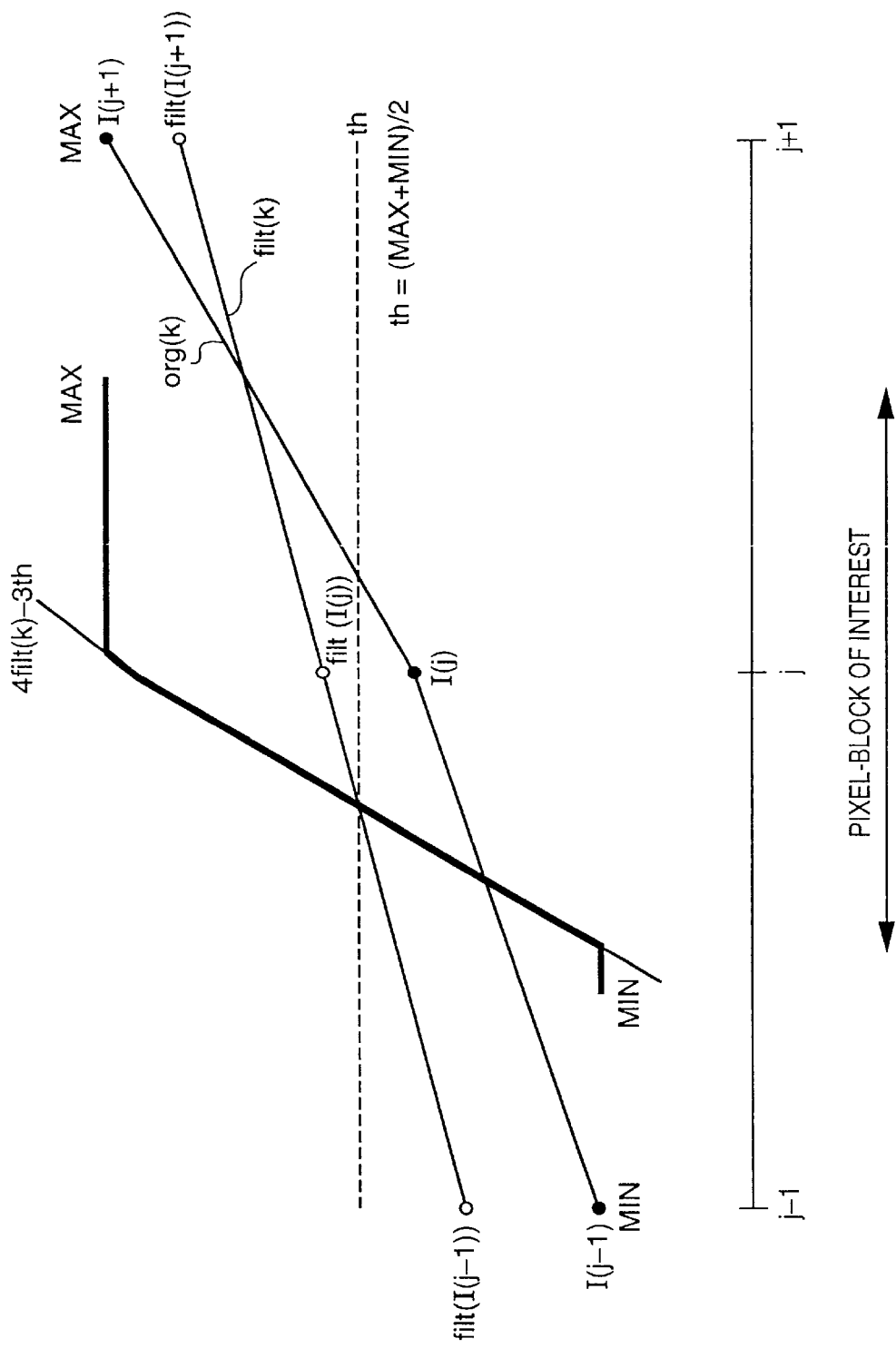

FIG. 19 shows edge generation in a case where a=4. Herein, since the transition line h(k) has an increased contrast, it is necessary to establish limitation for a density value. In FIG. 19, the aforementioned MAX and MIN values are set as the limitation values. The portion indicated by the bold line is the newly generated high resolution data of a pixel-block of interest.

Herein, comparison is made between the conventional edge generation process performed by separating the data into two values, and the process according to the present embodiment.

Figure 20:
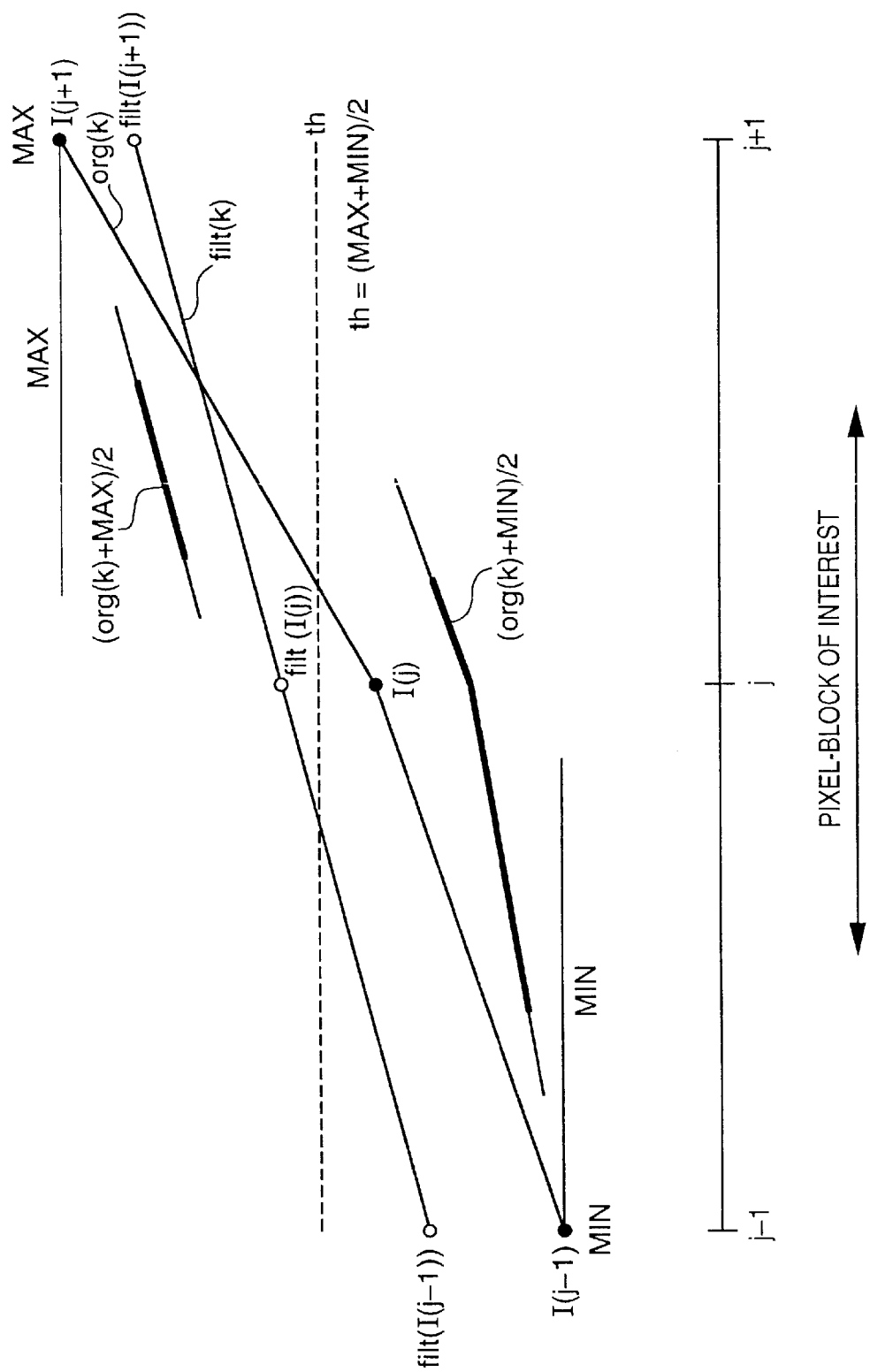
FIGS. 20 and 21 are graphs illustrating the conventional generation of an edge.

FIG. 20 shows transition lines which are obtained based on org(k) on which no smoothing process is performed. In FIG. 20:
when org(k)≧th, $$h(k) = (\text{org}(k)+MAX)/2$$

and when th>org(k), $$h(k) = (\text{org}(k)+MIN)/2 \quad (12)$$

As can be seen from the bold lines in FIG. 20, the edge position depends upon low resolution data. Moreover, since the processing is separated, continuity of the transition line is disturbed.

Figure 21:
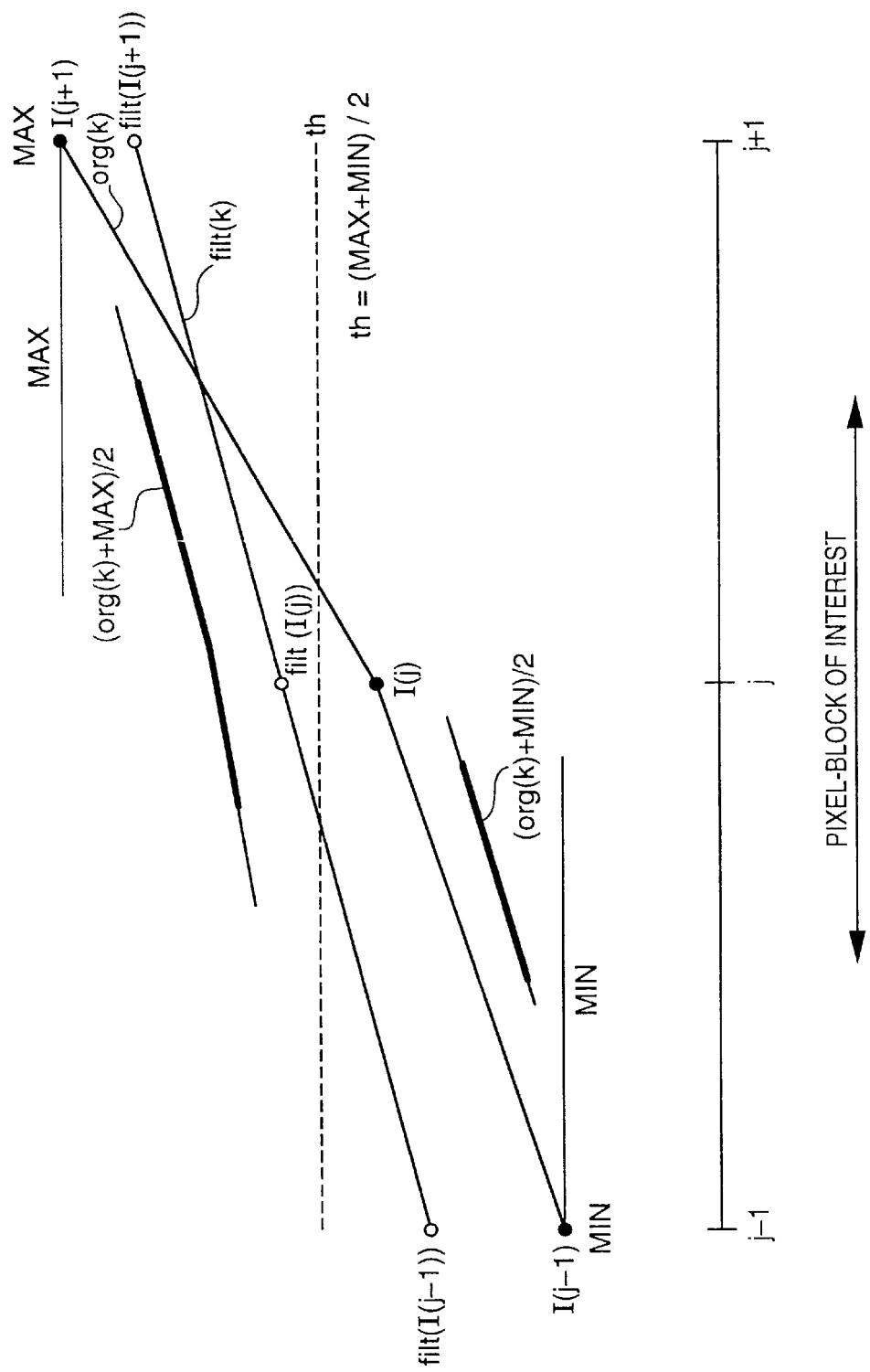

FIG. 21 shows transition lines based on filt(k) on which smoothing process is performed. In FIG. 21:
when filt(k)≧th, $$h(k) = (\text{org}(k)+MAX)/2$$

and when th>filt(k), $$h(k) = (\text{org}(k)+MIN)/2 \quad (13)$$

Herein, since an edge is generated based on the data on which smoothing process has been performed, continuity of the transition line is disturbed because the process is separated, though edge positions do not depend upon the low resolution data.

Meanwhile, if pixel values are calculated utilizing the function according to the present embodiment, based upon the above described equations (10) and (11), it is possible to generate an edge having an excellent quality without deteriorating continuity of a density transition line when processing a natural image. Moreover, since the coefficient a controls an inclination of an edge, the coefficient can be experimentally optimized to an output apparatus, or dynamically altered in accordance with characteristics of pixel values, such as a level of an edge contrast (a value obtained by MAX−MIN) or tone levels of neighboring pixels.

When the inclination is altered depending on the level of the edge contrast, it is desirable to make the inclination great as the contrast becomes higher (which means to increase the value of a in the equation (10)). The value a is determined by incorporating means for calculating the value (MAX−MIN). In practice, several values in terms of the value a are maintained in a sparse manner and the value a is changed over in accordance with (MAX−MIN).

Further, when the inclination is to be altered in accordance with a tone level of neighboring pixels, and in a case where an image has only two tones, the image should be determined as an artificial image and a large inclination should be set (a large value is set for the value a in the equation (10)). Accordingly, it is possible to obtain rough judgment from a distribution state of pixel values of neighboring pixels, that is, whether the pixel of interest is a part of a natural image or a part of an image e.g. CG or characters which are artificially generated by a computer, can be judged. Note that in an edge portion in a natural image, it is rare to have such condition where only two tones are found in a window of neighboring pixels. Since processing of increasing the inclination is an artificial process, it is also effective to control the inclination in accordance with image types classified as a natural image or an artificial image.

<Fifth Embodiment>

Figure 22:
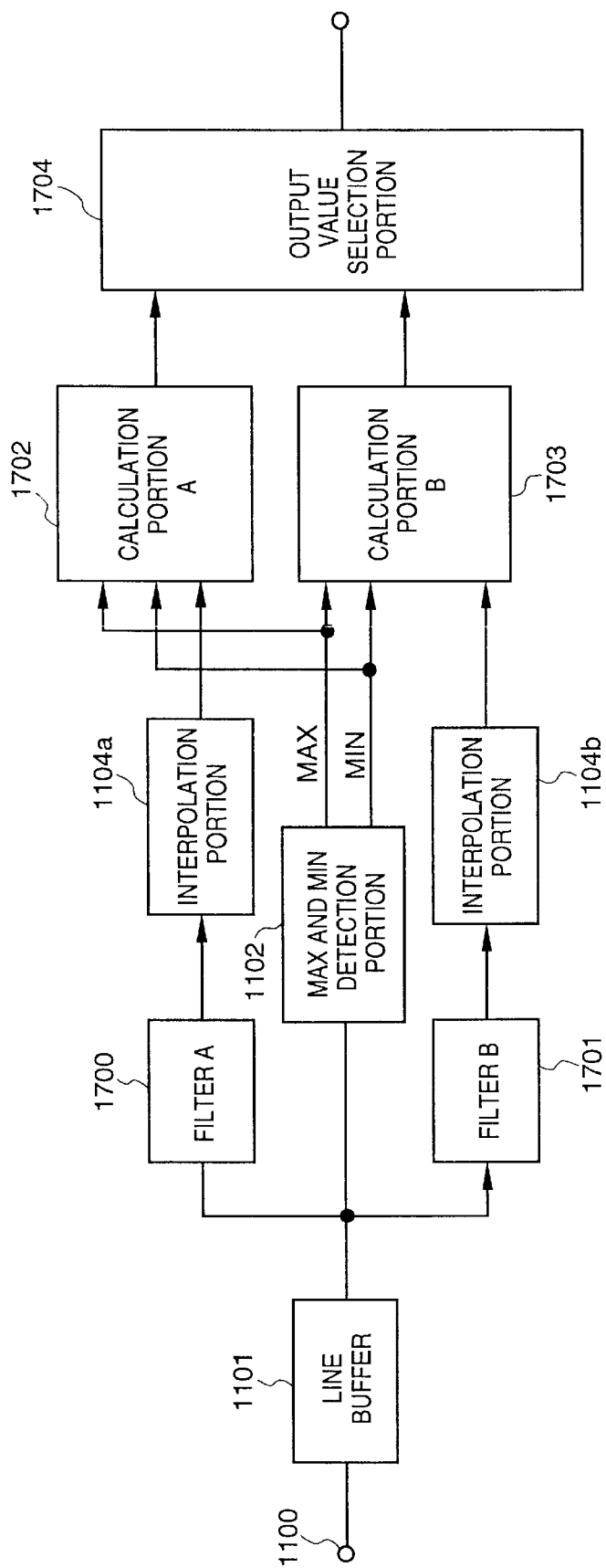
FIG. 22 is a block diagram showing a main part of an image processing apparatus according to a fifth embodiment.

FIG. 22 is a block diagram showing a main part of an image processing apparatus according to the fifth embodiment. In FIG. 22, the same reference numerals are assigned to those portions identical to FIG. 17.

Data corresponding to several lines of low resolution data inputted from the input terminal 1100 is stored in the line buffer 1101. In accordance with the several lines of image data, processing is performed in window units consisting of plural neighboring pixels including a pixel of interest. The reference numeral 1102 denotes the MAX and MIN detection portion for detecting a maximum value and a minimum value from the image data in the window. Reference numerals 1700 and 1701 denote filters (referred to as a filter A and a filter B respectively), each having different characteristics, for filtering each pixel in the window by these filters. For instance, a filter A is supposed to be the smoothing filter shown in FIG. 6, and a filter B to be the through filter shown in FIG. 23 (operation of the through filter is equivalent to no filtering). Note that types of filters are not limited to those shown in FIGS. 6 and 23, and further, not only two types of filters but plural types of filters may be utilized. Reference numerals 1104a and 1104b denote interpolation portions where linear interpolation is performed based on the pixel of interest and the neighboring pixels filtered by the above filters. Reference numerals 1702 and 1703 respectively denote calculation portions A and B, each of which calculates pixel values in a pixel-block of interest utilizing the interpolation data and the MAX and MIN values. In accordance with a value calculated by each of the calculation portions, a value to be outputted as a final output value is selected by an output-value selection portion 1704. In FIG. 22, two processing out of a series of processing including filtering, interpolation and calculation are performed in parallel, however, these processes may be performed in series.

Next, the calculation portions A (1702) and B (1703) are described.

Figure 23:
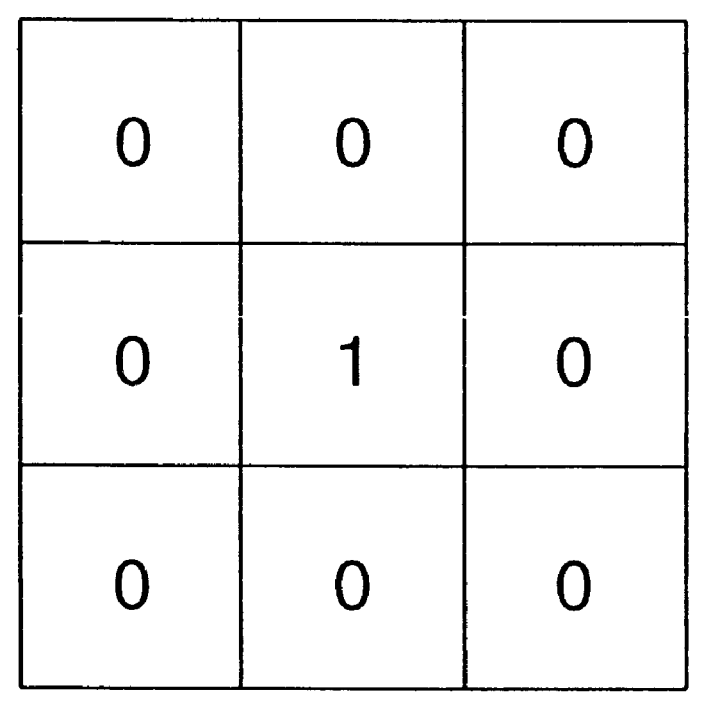

Data at the interpolation point k, on which the linear interpolation is performed after executing smoothing process utilizing the filter shown in FIG. 6, will be referred to as filtA(k) and similarly, data at the interpolation point k, on which the linear interpolation is performed after executing smoothing process utilizing the through filter shown in FIG. 23, will be referred to as filtB(k).

At the calculation portion A(1702), the following calculation similar to that calculated by the equation (10) is executed in order to obtain a density transition line hA(k) after conversion.

$$hA(k) = a \times \text{filtA}(k) + (-(a-1)/2))\text{MAX} + (-(a-1)/2))\text{MIN} \quad (14)$$

The above calculation is to alter the inclination based upon the line th, as a case similar to that in FIG. 18. That is, the calculation to obtain pixel values around high resolution edge which is to be generated, is performed.

In the calculation portion B (1703), following two calculations are performed. (Here, density transition line is referred to as hB1(k) and hB2(k).

$$hB1(k) = (d \times \text{filtB}(k) + (1 - d)\text{MAX}) \quad (15)$$
$$(0 < d < 1)$$

$$hB2(k) = (e \times \text{filtB}(k) + (1 - e)\text{MIN}) \quad (16)$$
$$(0 < e < 1)$$

In the equations (14), (15) and (16), the condition expressed by the equation (11) in which sum of the coefficients is 1, is satisfied.

The two values, hB1(k) and hB2(k), form pixel values at a portion which is somewhat spatially away from the center of an edge, compared with pixel values near the edge to be generated. In other words, these values serve as the "limitation" in FIG. 19. At the output-value selection portion 1704, each of the values as a result of calculations is compared and an output value D(k) is selected in the following manner.

When $hA(k) \geq hB1(k)$, $D(k) = hB1(k)$.

When $hB1(k) > hA(k) \geq hB2(k)$, $D(k) = hA(k)$.

And when $hB2(k) > hA(k)$, $D(k) = hB2(k)$ \quad (17)

Figure 24:
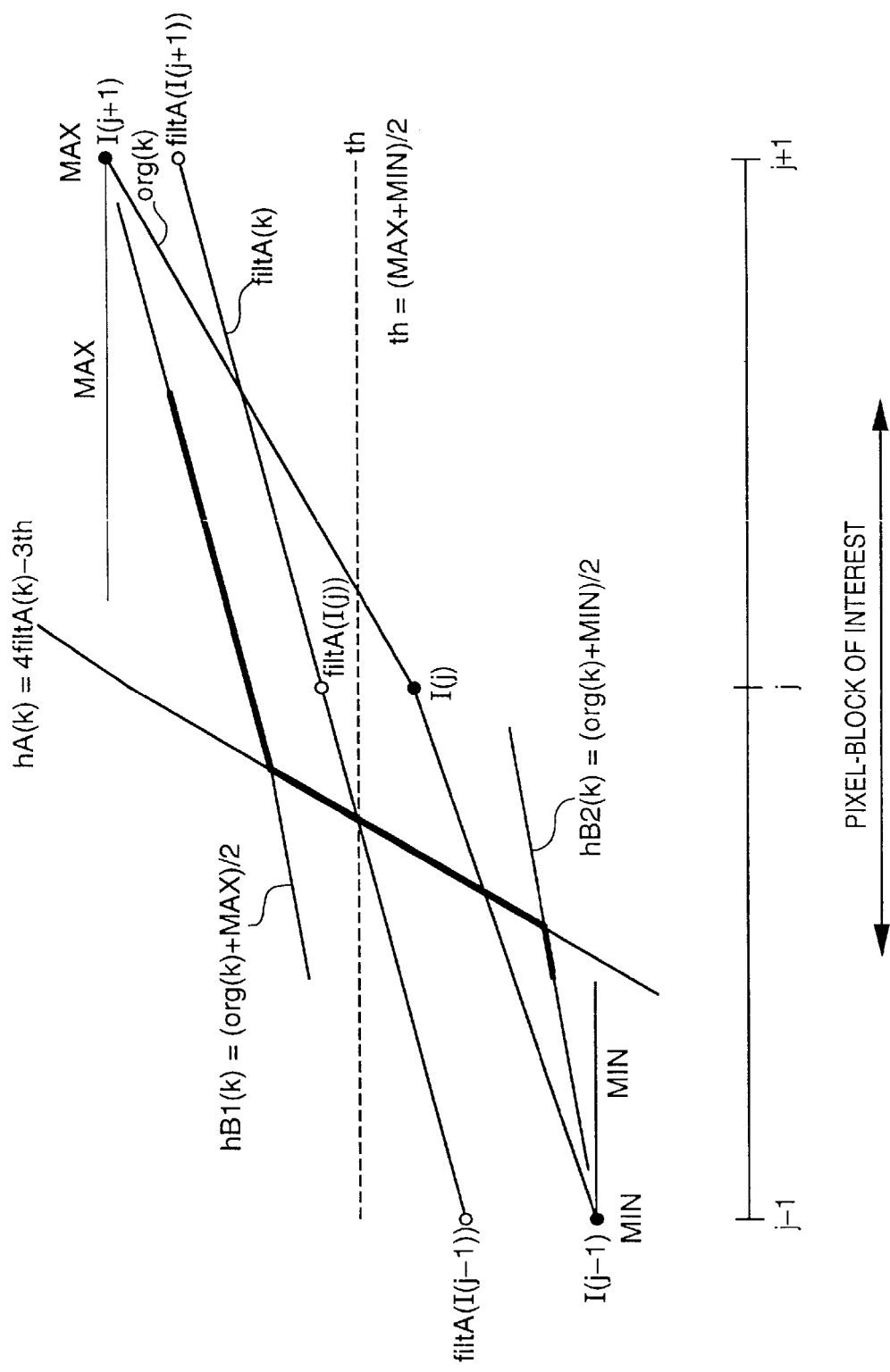
FIGS. 24 and 25 are graphs describing generation of an edge having high resolution according to the fifth embodiment.

The above described output value D(k) is illustrated in FIG. 24. A solid line indicated as a bold line denotes high resolution data D(k) to be generated by the pixel-block of interest.

In FIG. 24, as for a coefficient a for hA(k), a=4. In terms of a coefficient d for hB1(k), d=½, a coefficient e for hB2(k), e=½. In the present embodiment, since the filter shown in FIG. 23 is utilized as the filter B, the interpolation value filtB(k) after performing filtering processing is equivalent to org(k). As can be seen from the thick line in FIG. 24, it is possible to vary the inclination so that it has a sharp gradient at a high-resolution edge portion to be desired to generate, and a slow gradient at a portion spatially away from the center of the edge. In addition, such alteration in gradient can be realized without disturbing its continuity. In other words, any edge data having high resolution can be freely predicted and generated, by comparing plural types of values which have been interpolated and by selecting a value therefrom.

Further, when the processing proceeds to the next pixel of interest, it is necessary to maintain the continuity with the previous pixel-block of interest.

Furthermore, it is also possible to employ a method where plural types of interpolations and calculations are executed, with only one type of a filter, and an output value is selected from the plural results of the calculations. For instance, by utilizing the filter A (1700) alone, following three types of density transition lines (hA1(k), hA2(k), and hA3(k)) are calculated.

$$hA1(k) = a \times filtA(k) + (-(a-1)/2))\text{MAX} + (-(a-1)/2))\text{MIN} \quad (18)$$

$$hA2(k) = (d \times filtA(k) + (1-d) \times \text{MAX}) \quad (19)$$
$$(0 < d < 1)$$

$$hA3(k) = (e \times filtA(k) + (1-e) \times \text{MIN}) \quad (20)$$
$$(0 < e < 1)$$

Similar to the example shown in FIG. 24, the output-value selection portion 1704 compares each of the values resulting from the calculations and selects an output value D(k) in the following manner.

When hA1(k)≧hA2(k), $$D(k) = hA2(k)$$

when hA2(k)>hA1(k)≧hA3(k), $$D(k) = hA1(k) \quad (21)$$

And when hA3(k)>hA1(k), $$D(k) = hA3(k)$$

Figure 25:
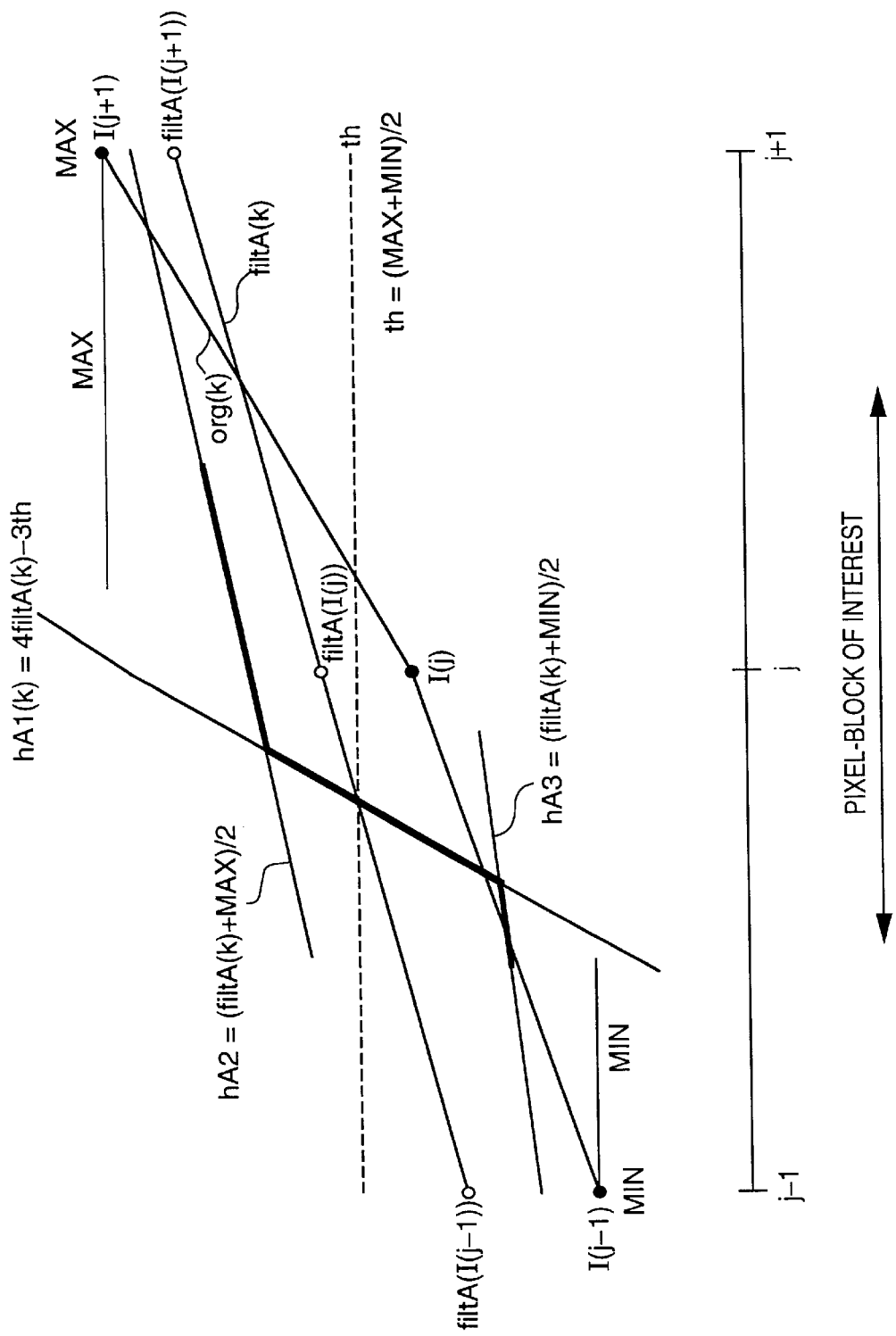

A bold line indicated in FIG. 25 denotes a result of data generated in the pixel-block of interest. In this example, generating process of high resolution data is simple and easy since only one type of processing is utilized for filtering and interpolation. In the above example, high resolution edge is generated in one dimension, and the same method can be applied when it is extended to two dimensions. A window used when MAX and MIN values are detected, a window used when filtering is performed, and a window necessary for interpolation may be the same size or may be a different size. Alternatively, calculations for interpolation and filtering can be combined so that the number of calculations for multiplication and addition is decreased. Other interpolation methods besides the linear interpolation may be applicable.

In the foregoing descriptions, explanation has been provided for a filter which is used for smoothing, which leads to a case where important data will be lost because of the smoothing process. If such case is predicted, a different type of filter can be utilized from the beginning of processing. Alternatively, filters can be dynamically switched in accordance with evaluation of characteristics of an image.

In the foregoing processing, although two values, the MAX and MIN values, are extracted from neighboring pixels, the present invention is not limited to these two values. The pixel may include other pixel which has a value such as a mean value in the window, and also the number of pixels to be extracted is not limited to two. For instance, MAX and MIN values may be detected from each of two types of windows having a different window size, and a density transition line may be generated by a function utilizing the four types of values detected as a result of the detection.

Assuming that each of the pixel values of the neighboring pixels to be extracted is P(n), the equation (11) can be expressed as follows.

$$h(k) = a \times \text{filt}(k) + b \times P(1) + c \times P(2) + d \times P(3) + e \times P(4) + \quad (22)$$

If m neighboring pixels are to be extracted, the equation can be generally expressed as followings.

$$h(k) = a \times filt(k) + \sum_{n=1}^{m} a(n)P(n) \quad (23)$$

where $a + \sum_{n=1}^{m} a(n) = 1$.

Figure 26:
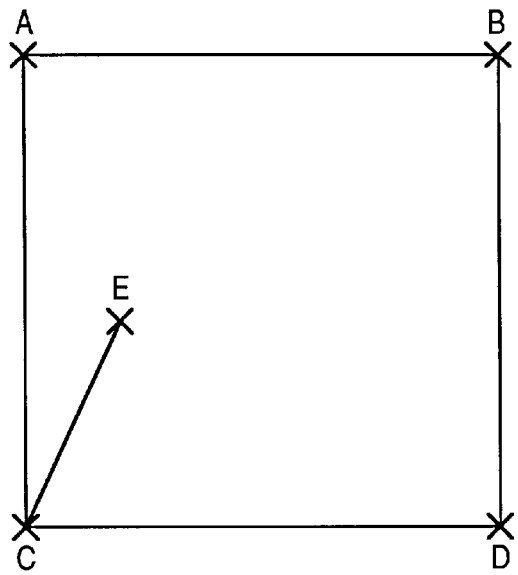
FIG. 26 is an explanatory view showing a conventional method of nearest neighbor interpolation.
Figure 27:
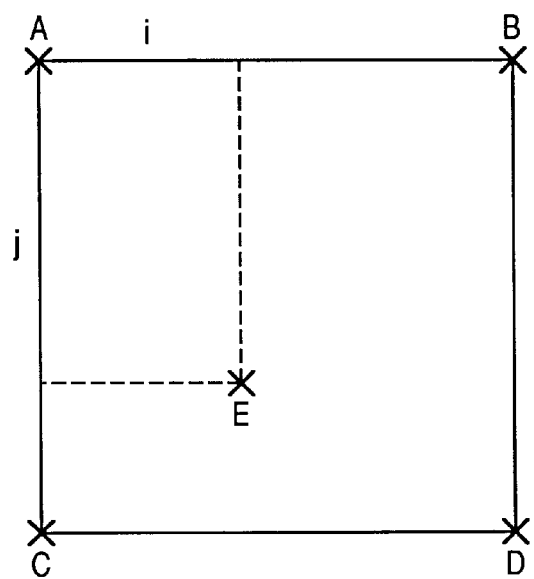
FIG. 27 is an explanatory view showing a conventional method of a bi-linear interpolation.

In this case, there are plural combinations of a, α(n) and P(n) and an output value D(k) can be selected from the plurality of calculated h(k)'s. Further, as described above, in a case where a filter is not limited to the smoothing filter, the equation (23) can be generally expressed as follows when an interpolation value at an interpolation point k is C(k).

$$h(k) = \sum_{n=1}^{m} a(n)P(n) + bC(k) \quad (24)$$

where α(n) and β are arbitrary coefficients, and $$\sum_{n=1}^{m} a(n) \neq 0$$

and β≠0.

$$\sum_{n=1}^{m} a(n) + b = 1 \quad (25)$$

h(k) which satisfies the equations (24) and (25) is a sum of a function depending upon an interpolation point and a function in dependent of the interpolation point. In the example shown in FIG. 26, a function does not depend upon an interpolation point to substitute a neighboring observation point (in substitution of the nearest observation point, a pixel-block of interest having a pixel of interest as its center as an observation point obtains a fixed value without being affected by an interpolation point. However, in the example shown in FIG. 27, a function depends upon the interpolation point. Moreover, in the conventional interpolation calculation utilizing a higher order, the function depends upon the interpolation point. When high resolution data is to be generated, certain data generation, e.g. prediction of an edge position, or alteration of an inclination of contrast, must be performed for realizing data conversion with excellent image quality. More specifically, new data generation cannot be realized only with such functions which depend upon the interpolation point. In view of the above, the present invention performs prediction of high resolution data which does not exist in original data. As described above, by virtue of the transition characteristics satisfying the equations (24) and (25), prediction of an edge position and alteration of an inclination of contrast can be flexibly set, thereby realizing excellent data conversion.

As set forth above, according to the present invention, when inputted low resolution data is converted to high resolution data, conversion process resulting in excellent image quality with no jaggedness can be realized without causing a blur due to interpolation processing which is particularly problematic in processing a natural image, and without depending upon the low resolution characteristic of the original image. Moreover, at the time of generating high resolution data, processing according to the present invention is not separated unlike the conventional threshold value processing, accordingly, a smooth, natural and clear image can be readily generated in processing a natural image. By virtue of a technique according to the present invention, products such as a printer or a video printer can be provided in which an image having excellent quality can be outputted even if the original image provides a small amount of information.

The present invention can be applied to a system constituted by a plurality of devices, or to an apparatus comprising a single device. Furthermore, the invention is applicable also to a case where the object of the invention is attained by supplying a program to a system or apparatus.

The present invention is not limited to the above embodiments and various changes and modifications can be made within the spirit and scope of the present invention. Therefore, to appraise the public of the scope of the present invention, the following claims are made.

What is claimed is:

1. An image processing apparatus for converting inputted image data having low resolution to image data having high resolution and performing a process for increasing the number of pixels of the inputted image data, comprising:

detecting means for detecting a maximum pixel value and a minimum pixel value of the image data having a low resolution in a block of interest;

interpolation means for determining an interpolation value of an interpolation point by using a function depending upon spatial distances between the interpolation point and positions of pixels of the image data having the low resolution in the neighborhood of the interpolation pixel;

first calculation means for calculating a difference value between the interpolation value and a reference value obtained from the maximum pixel value and the minimum pixel value;

second calculation means for calculating a contrast value on the basis of the maximum pixel value and the minimum pixel value; and determination means for determining an output value at the interpolation point on the basis of a relationship between the difference value and the contrast value.

2. The image processing apparatus according to claim 1, wherein the reference value is a median value of the maximum pixel value and the minimum pixel value of the pixels of the image data having the low resolution in the neighborhood of the interpolation point.

3. The image processing apparatus according to claim 1, wherein a look-up table (LUT) is used for determination of the output value of the interpolation point by said determination means.

4. The image processing apparatus according to claim 1, further comprising smoothing means for performing smoothing processing using an LPF (low pass filter) on the image data having low resolution, wherein said detecting means detects the maximum pixel value and the minimum pixel value of the image data having the low resolution before the smoothing processing is performed by said smoothing means, and wherein said interpolation means determines the interpolation value on the basis of the smoothed image data.

5. The image processing apparatus according to claim 1, wherein said interpolation means executes a linear interpolation process.

6. An image processing method for converting inputted image data having low resolution to image data having high resolution and performing a process for increasing the number of pixels of the inputted image data, comprising the steps of:

detecting a maximum pixel value and a minimum pixel value of the image data having a low resolution in a block of interest;

determining an interpolation value of an interpolation point by using a function depending upon spatial distances between the interpolation point and positions of a pixels of the image data having the low resolution in the neighborhood of the interpolation pixel;

calculating a difference value between the interpolation value and a reference value obtained from the maximum pixel value and the minimum pixel value;

calculating a contrast value on the basis of the maximum pixel value and the minimum pixel value; and determining an output value at the interpolation point on the basis of a relationship between the difference value and the contrast value.

7. The image processing method according to claim 6, wherein the reference value is a median value of the maximum pixel value and the minimum pixel value of the pixels of the image data having the low resolution in the neighborhood of the interpolation point.

8. The image processing method according to claim 6, wherein a look-up table (LUT) is used for determination of the output value for the interpolation point in said determination step of determining an interpolation value.

9. The image processing method according to claim 6, further comprising the step of performing smoothing processing using an LPF (low pass filter) on the image data having low resolution, wherein the maximum pixel value and the minimum pixel value are detected from the image data having the low resolution before the smoothing processing, and wherein the interpolation value is determined on the basis of the smoothed image data.

10. The image processing method according to claim 6 wherein in said interpolation step, a linear interpolation process is executed.

11. An image processing apparatus for converting inputted image data having low resolution and increasing the number of pixels of the inputted image data, comprising:

interpolation means for determining an interpolation value C(k) of an interpolation point k by using a function depending upon spatial distances between the interpolation point and positions of pixels of the image data having low resolution in the neighborhood of the interpolation point k;

detection means for detecting m (m≧1) pixels (note that a pixel value of a pixel at an observation point n included in the m pixels is P(n)) from pixels neighboring the interpolation point k; and calculation means for calculating an output value h(k) at the interpolation point k, by calculating $$h(k) = \sum_{n=1}^{m} \alpha(n)P(n) + \beta C(k)$$

where α(n) and β are arbitrary coefficients, and $$\sum_{n=1}^{m} \alpha(n) \neq 0$$

and β≠0.

12. The image processing apparatus according to claim 11, further comprising smoothing means for smoothing the image date having low resolution, wherein said detecting means detects P(n) from the image data having low resolution before the smoothing processing, and wherein said interpolation means determines the interpolation value on the basis of the smoothed image data.

13. The image processing apparatus according to claim 11, wherein a relationship between the coefficients α(n) and β satisfies $$\sum_{n=1}^{m} \alpha(n) + \beta = 1.$$

14. The image processing apparatus according to claim 13, wherein when m=2, $$\alpha(1) = \alpha(2) = -(\beta-1)/2$$

is satisfied.

15. The image processing apparatus according to claim 11, wherein the α(n), P(n) and β form plural combinations, and wherein in accordance with the combinations, a most appropriate value is selected as an output value D(k) by mutually comparing plural values expressed by said h(k) calculated by said calculation means.

16. The image processing apparatus according to claim 11, wherein the α(n), P(n) and β form plural combinations, and wherein in accordance with a distribution state of pixel values of the pixels neighboring the pixel of interest, a most appropriate combination is dynamically selected, and the output value h(k) is calculated according to the selected combination.

17. The image processing apparatus according to claim 16, wherein the distribution state of pixel values is a contrast value of the pixels neighboring the pixel of interest.

18. The image processing apparatus according to claim 14, wherein the distribution state of pixel values is a tone level of the pixels neighboring the pixel of interest.

19. The image processing apparatus according to claim 16, wherein when m=2, α(1) and α(2) are respectively a maximum value and a minimum value of the pixels neighboring the pixel of interest.

20. The image processing apparatus according to claim 11, further comprising filtering means for filtering the image data having low resolution by e (e≧1) types of filters, wherein said interpolation means interpolates the pixel of interest so as to obtain pixels the predetermined times as many in accordance with the filtering results, and wherein a most appropriate value is selected as an output value D(k) from the plural values expressed by h(k) calculated by the filtering using the e types of filters and by the plural combinations of α(n), P(n) and β.

21. An image processing method for converting inputted image data having low resolution and increasing the number of pixels of the inputted image data, comprising the steps of:

determining an interpolation value C(k) of an interpolation point k by using a function depending upon spatial distances between the interpolation point k and positions of pixels of the image data having low resolution in the neighborhood of the interpolation point k;

detecting m (m≧1) pixels (note that a pixel value of a pixel at an observation point n included in the m pixels is P(n)) from pixels neighboring the interpolation point k; and calculating an output pixel value h(k) at the interpolation point k, by calculating $$h(k) = \sum_{n=1}^{m} \alpha(n)P(n) + \beta C(k)$$

where α(n) and β are arbitrary coefficients, and $$\sum_{n=1}^{m} \alpha(n) \neq 0$$

and β≠0.

22. The image processing method according to claim 17, further comprising the step of filtering the image data having low resolution by e (e≧1) types of filters, wherein in said interpolation step, the pixel of interest is interpolated so as to obtain pixels the predetermined times as many, in accordance with the filtering results, and wherein a most appropriate value is selected as an output value D(k) from the plural values expressed by h(k) calculated by the filtering using the e types of filters and by plural combinations of α(n), P(n) and β.

* * * * *

UNITED STATES PATENT AND TRADEMARK OFFICE
CERTIFICATE OF CORRECTION

PATENT NO. : 5,917,963
DATED : June 29, 1999
INVENTOR(S) : NOBUTAKA MIYAKE

It is certified that error appears in the above-identified patent and that said Letters Patent is hereby corrected as shown below:

COLUMN 6

Line 18, "an" should read --a--.

COLUMN 9

Line 3, "more" should read --more,--.

COLUMN 10

Line 57, "OUT(i,j)" (second occurrence) should read --OUT(I,j)--.

COLUMN 11

Line 56, "oppose" should read --opposed--.

COLUMN 20

Line 7, delete "a";
Line 67, "date" should read --data--.

COLUMN 21

Line 38, "14," should read --16,--;
Line 40, "16," should read --14,--.

UNITED STATES PATENT AND TRADEMARK OFFICE
CERTIFICATE OF CORRECTION

PATENT NO. : 5,917,963
DATED : June 29, 1999
INVENTOR(S) : NOBUTAKA MIYAKE

It is certified that error appears in the above-identified patent and that said Letters Patent is hereby corrected as shown below:

<u>COLUMN 22</u>

Line 35, "method" should read --apparatus--.

Signed and Sealed this

Fourth Day of July, 2000

Attest:

Q. TODD DICKINSON

Attesting Officer

Director of Patents and Trademarks